(12) United States Patent
Nakajima et al.

(10) Patent No.: US 10,134,323 B2
(45) Date of Patent: Nov. 20, 2018

(54) IMAGE DISPLAY DEVICE

(71) Applicant: MAXELL, LTD., Kyoto (JP)

(72) Inventors: Mitsuo Nakajima, Tokyo (JP); Nobuhiro Fukuda, Tokyo (JP)

(73) Assignee: Maxell, Ltd., Kyoto (JP)

( * ) Notice: Subject to any disclaimer, the term of this patent is extended or adjusted under 35 U.S.C. 154(b) by 0 days.

(21) Appl. No.: 15/995,263

(22) Filed: Jun. 1, 2018

(65) Prior Publication Data
US 2018/0286301 A1  Oct. 4, 2018

Related U.S. Application Data

(63) Continuation of application No. 15/101,083, filed as application No. PCT/JP2013/084655 on Dec. 25, 2013, now Pat. No. 10,013,905.

(51) Int. Cl.
| | | |
|---|---|---|
| *G09G 5/00* | (2006.01) |
| *G09G 3/20* | (2006.01) |
| *H04N 9/73* | (2006.01) |
| *H04N 9/31* | (2006.01) |
| *G09G 5/02* | (2006.01) |

(52) U.S. Cl.
CPC ............. *G09G 3/2003* (2013.01); *G09G 5/02* (2013.01); *H04N 9/3182* (2013.01); *H04N 9/73* (2013.01); *G09G 2320/0233* (2013.01); *G09G 2320/0666* (2013.01); *G09G 2360/144* (2013.01)

(58) Field of Classification Search
CPC .................. G09G 3/2003; G09G 3/20; G09G 2320/0233; G09G 2320/0666; G09G 2360/14
See application file for complete search history.

(56) References Cited

U.S. PATENT DOCUMENTS 7,386,185 B2  6/2008  Watanabe
8,831,372 B2  9/2014  Akiyama
(Continued)

FOREIGN PATENT DOCUMENTS

JP  2004-038842 A  2/2004
JP  2005-004506 A  1/2005
(Continued)

OTHER PUBLICATIONS

Yoshihiro Nozato et al., "Comparison of Retinex Models for Hardware Implementation", IEICE Technical Report SIS2005-16 (Jun. 2005), p. 19-24.
(Continued)

*Primary Examiner* — Vijay Shankar
(74) *Attorney, Agent, or Firm* — Mattingly & Malur, PC

(57) ABSTRACT

An image whose visibility has been more suitably improved is obtained. The device includes an image input unit which inputs an image, an image processing unit which performs Retinex processing with respect to the input image input by the image input unit and performs image signal generation to generate a new image signal based on information concerning a color of the input image and information of an absolute value or Y-value of a color space vector of the image signal having undergone the Retinex processing, and a display unit which displays an image based on the image signal having undergone image processing by the image processing unit.

18 Claims, 19 Drawing Sheets

(56) References Cited

U.S. PATENT DOCUMENTS

| | | |
|---|---|---|
| 10,013,905 B2 * | 7/2018 | Nakajima ............ H04N 9/3182 |
| 2005/0104974 A1 | 5/2005 | Watanabe et al. |
| 2012/0093432 A1 | 4/2012 | Akiyama |

FOREIGN PATENT DOCUMENTS

| | | |
|---|---|---|
| JP | 2005-176171 A | 6/2005 |
| JP | 2012-085182 A | 4/2012 |

OTHER PUBLICATIONS

D. J. Jobson et al., Properties of a Center/Surround Retinex: Part 2. Surround Design, NASA Technical Memorandum, 110188, Aug. 1995.

Zia-ur Rahman et al., "Multiscal Retinex for Color Image Enhancement", IEEE 1996. p. 1003-1006.

International Search Report of PCT/JP2013/084655 dated Mar. 18, 2014.

* cited by examiner

F I G. 5 C
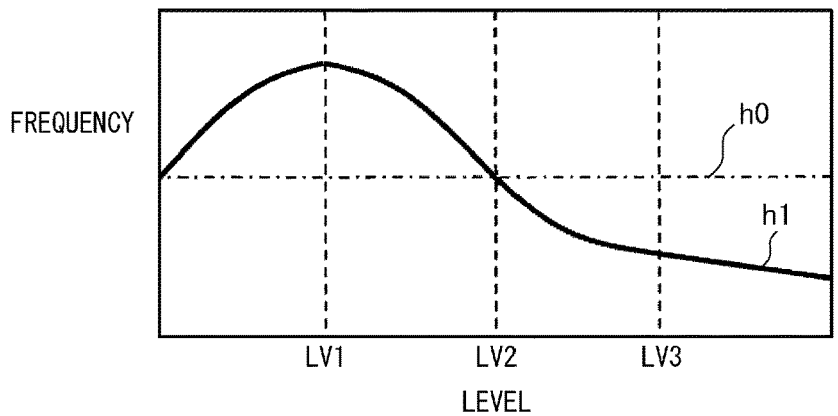
F I G. 5 D
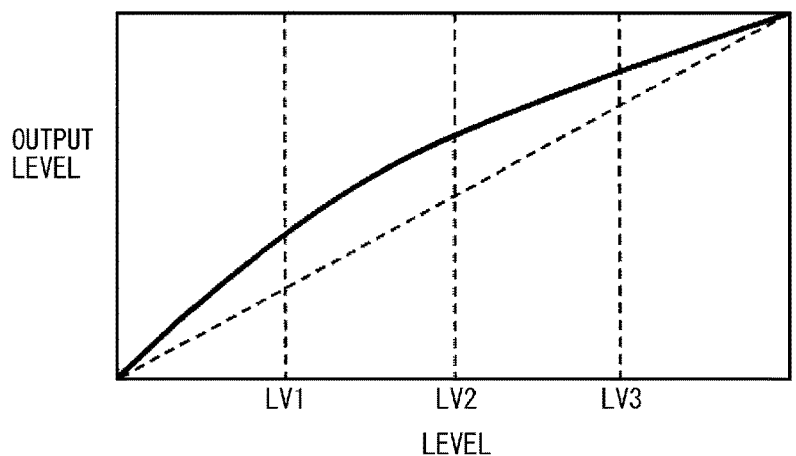
F I G. 5 E
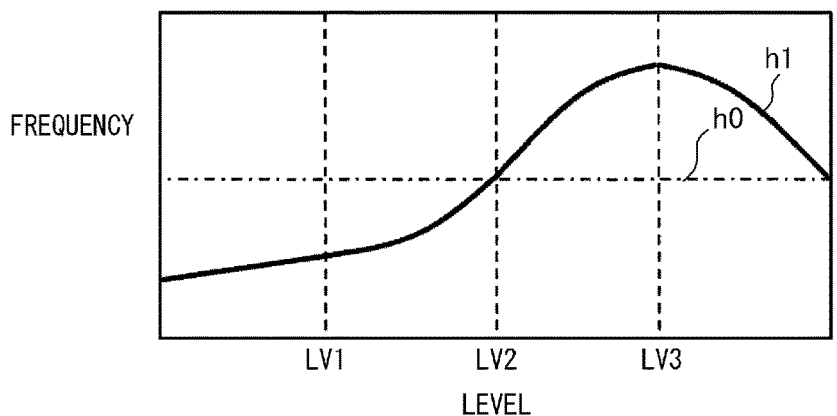

F I G . 1 1 A
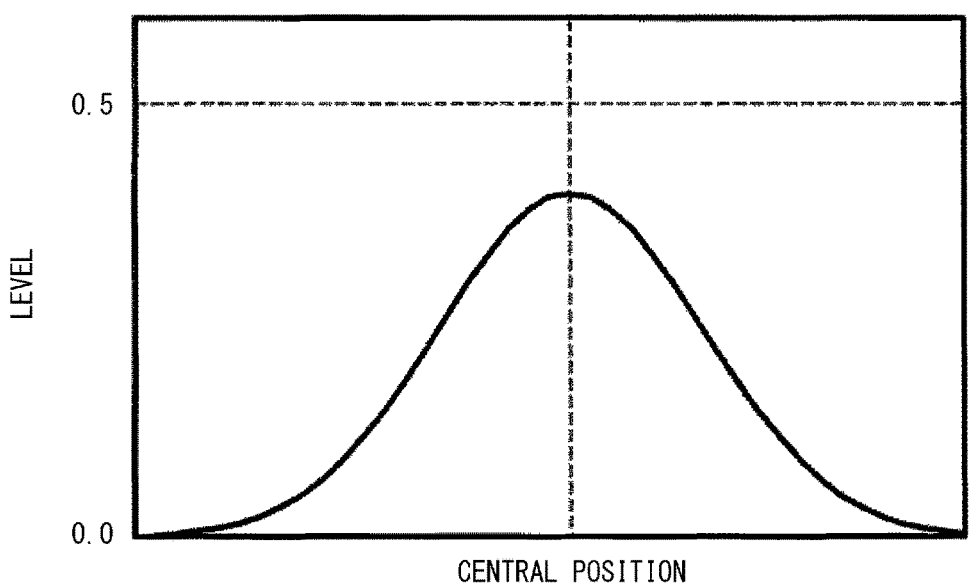
F I G . 1 1 B
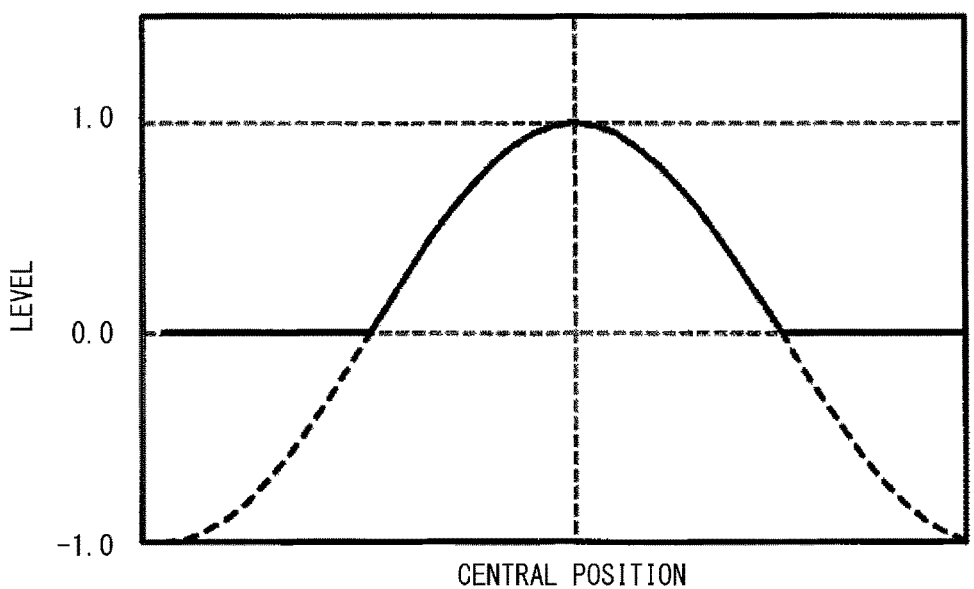

F I G. 2 5
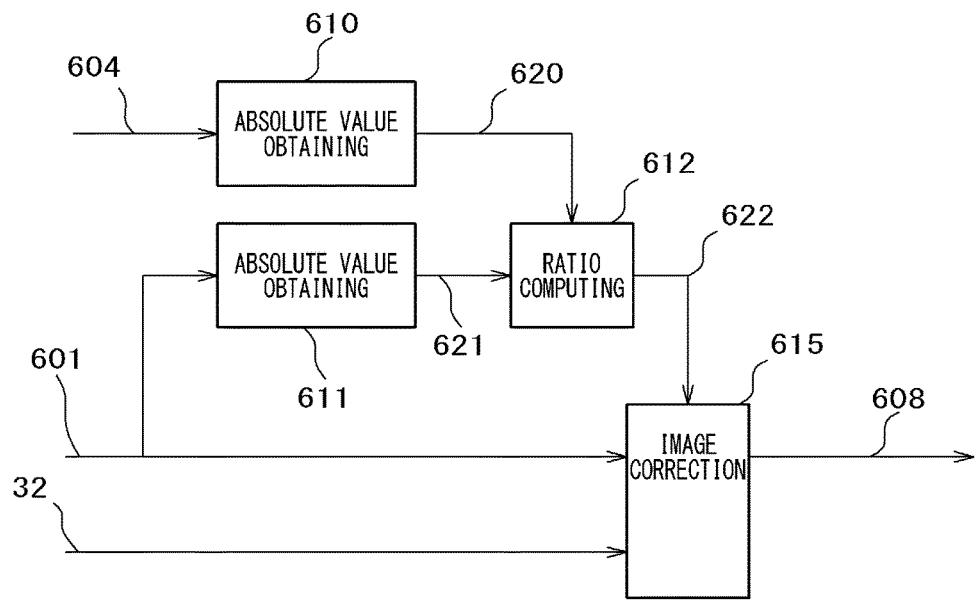
F I G. 2 6
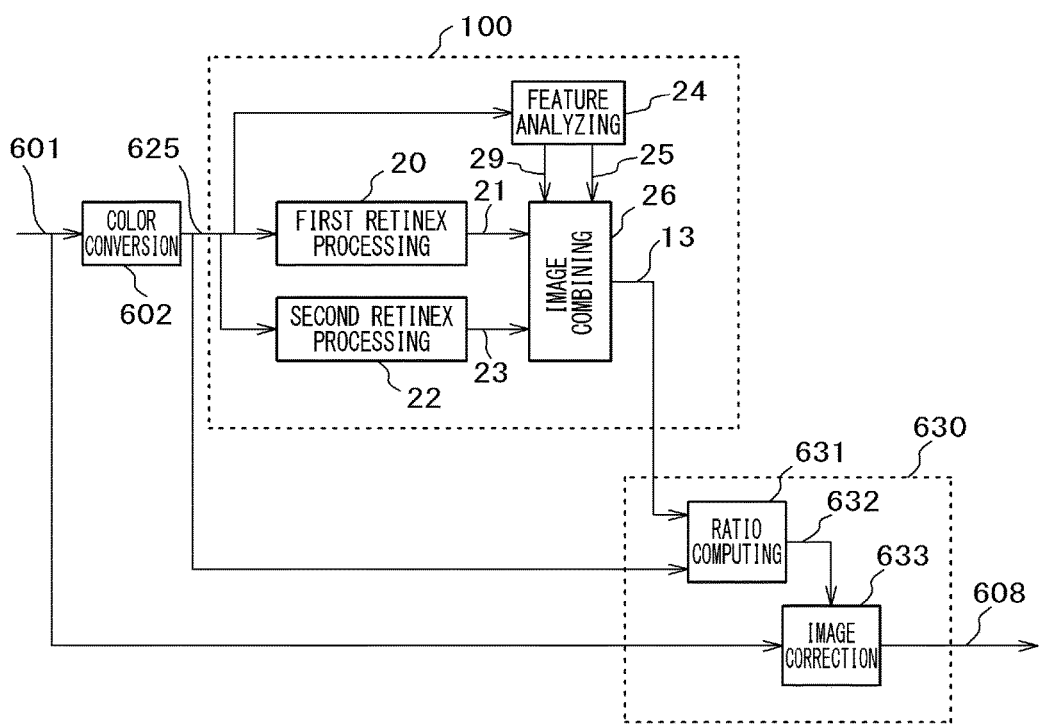

F I G . 2 7
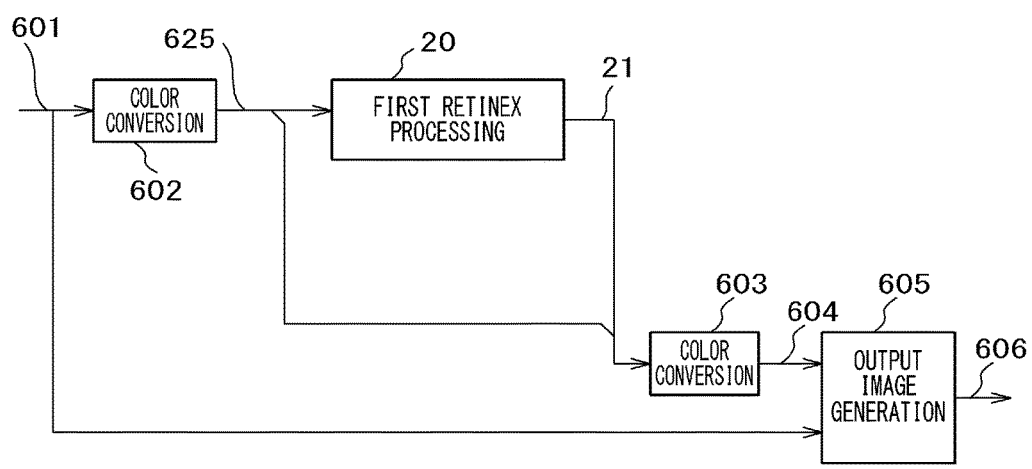

IMAGE DISPLAY DEVICE

TECHNICAL FIELD

The present invention relates to an image processing technique.

BACKGROUND ART

Patent literature 1 discloses a background art in this technical field. According to this literature, in Multi Scale Retinex Processing, a composite blur image is generated by selecting, for each pixel, any of a plurality of blur images with different degrees of blurring, which are generated by a plurality of peripheral functions with different scales, in accordance with the pixel value levels of an original image to be processed. The literature describes that a low-pass filter is applied to the composite blur image to prevent the unnatural discontinuity of boundaries and perform Retinex Processing (see the abstract).

CITATION LIST

Patent Literature

PTL 1: Japanese Patent Application Laid-Open No. 2005-004506

SUMMARY OF INVENTION

Technical Problem

An image signal has various parameters such as luminances, colors, and frequency components as parameters representing the properties of a shot object. The values of these parameters differ as to different scenes of the image. In order to display an image with good visibility, it is necessary to perform image correction by changing properties such as contrast correction of the image in accordance with the features of the image.

However, a technique of implementing higher performance in terms of dynamic range compression by adjusting a plurality of scales in MSR as in patent literature 1 described above gives consideration to the contribution of a plurality of scales to an image but gives no consideration to the characteristics of an object. As a consequence, an image is uniformly corrected regardless of the characteristics of an object in the image.

In addition, the technique of implementing higher performance in terms of dynamic range compression by adjusting a plurality of scales in MSR as in patent literature 1 described above gives consideration to the contribution of a plurality of scales to an image but gives no consideration to the contribution of differences in reflection property to an image.

Solution to Problems

In order to solve the above problems, an aspect of an embodiment of the present invention may be configured to include an image input unit which inputs an image, an image processing unit which performs Retinex processing with respect to the input image input by the image input unit and performs image signal generation to generate a new image signal based on information concerning a color of the input image and information of an absolute value or Y-value of a color space vector of the image signal having undergone the Retinex processing, and a display unit which displays an image based on the image signal having undergone image processing by the image processing unit.

Advantageous Effects of Invention

The present invention can obtain an image with more suitably improved visibility.

BRIEF DESCRIPTION OF DRAWINGS

FIG. 5C is a graph showing an example of the luminance histogram of an image;

FIG. 5D is a graph showing an example of the input/output characteristic of an image;

FIG. 5E is a graph showing an example of the luminance histogram of an image;

FIG. 11A is a graph for explaining a Gaussian distribution;

FIG. 11B is a graph for explaining a luminance distribution in the form of a cosine distribution;

FIG. 25 is a block diagram showing an example of the arrangement of an output image generation unit;

FIG. 26 is a block diagram showing an example of the arrangement of an image correction unit according to Example 6 of the present invention; and FIG. 27 is a block diagram showing an example of the arrangement of an image correction unit according to Example 8 of the present invention.

DESCRIPTION OF EMBODIMENTS

Figure 1:
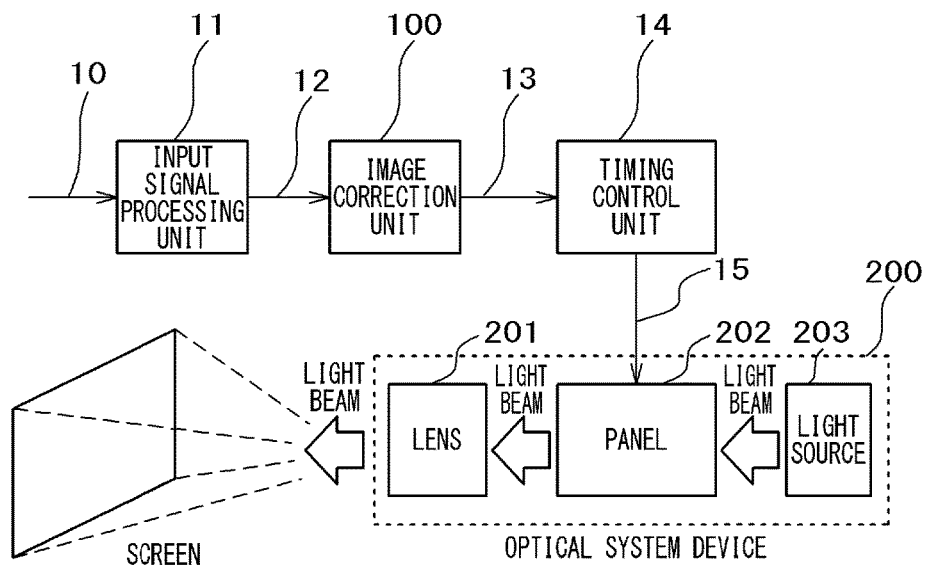
FIG. 1 is a block diagram showing an example of the arrangement of an image display device according to Example 1 of the present invention.

Embodiments of the present invention will be described below with reference to the accompanying drawings. The present invention is not, however, limited to these embodiments. Note that the same reference numerals denote the same members in the respective drawings for explaining the embodiments, and a repetitive description of them will be omitted.

Example 1

Example 1 will exemplify an image display device, as the arrangement of a projector, which decomposes an image for each reflection property of light and performs image correction. Although a front projector will be exemplified below, its form may include a rear projection television. In addition, Example 1 may include a display device using a direct-view flat-panel display such as a liquid crystal display, plasma display or organic EL display, which does not perform enlarged projection on the panel. This applies to any of Examples described below.

FIG. 1 is a block diagram showing an example of the arrangement of an image display device according to Example 1.

This image display device includes an input signal processing unit 11 which receives an image input signal 10 and converts it into an internal image signal 12 by using, for example, a compressed image signal decoder, IP conversion, or scaler, an image correction unit 100 which receives the internal image signal 12, a timing control unit 14 which receives a corrected image signal 13 and generates a display control signal 15 based on the corrected image signal and horizontal/vertical synchronization signals for a display screen, and an optical system device 200 which displays an image.

The optical system device 200 includes a light source 203 which applies a light beam to project an image onto the screen, a panel 202 which generates a projection image by receiving the display control signal 15 and adjusting the tone of the light beam from the light source 203 for each pixel, and a lens 201 for enlarged projection of a projection image on the screen.

Note that when the image display device is a direct-view flat-panel display such as a liquid crystal display, plasma display, or organic EL display, the lens 201 of the optical system device 200 is not required. The user will directly view the panel 202.

Figure 2:
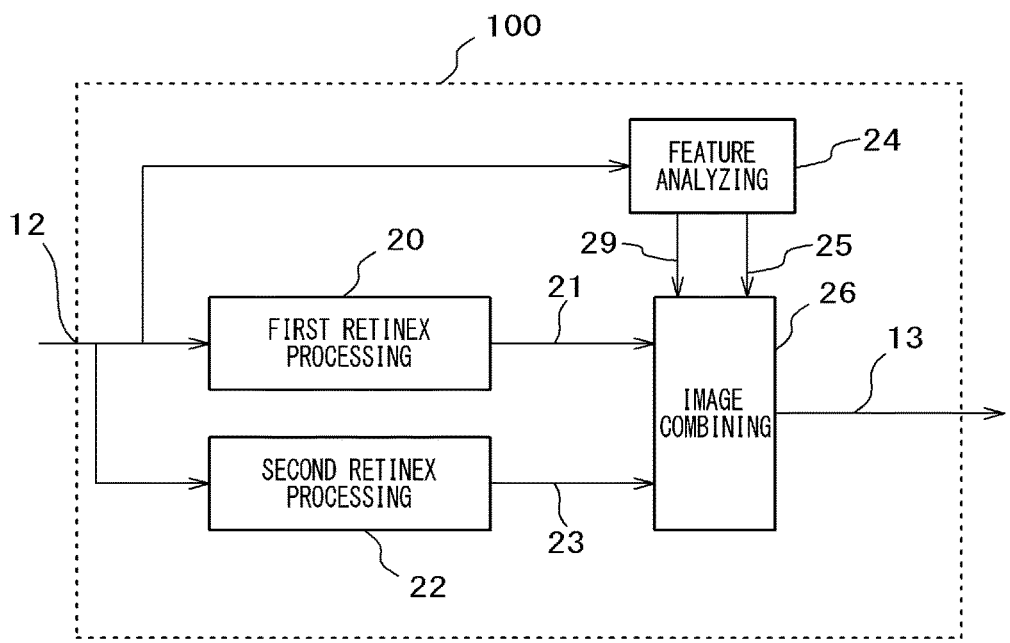
FIG. 2 is a block diagram showing an example of the arrangement of an image correction unit.

FIG. 2 shows an example of the arrangement of the image correction unit 100. A first Retinex processing unit 20 and a second Retinex processing unit 22 perform image processing based on a Retinex theory with respect to the internal image signal 12 and respectively output a first corrected image signal 21 and a second corrected image signal 23.

In this case, the Retinex theory explains human visual characteristics such as color constancy and brightness constancy. According to this theory, it is possible to separate illumination light components from an image and extract reflected light components from the image.

When performing image correction processing based on the Retinex theory, therefore, it is possible to obtain an image with high visibility even from an image in a dark room or against bright light by removing illumination light components which degrade the visibility of an object such as a human figure in the image and extracting reflected light components. This makes it possible to suitably compress even a dynamic range that looks natural to the human eye by using digital tones.

The Retinex theory includes many models depending on techniques of estimating illumination light components and reflected light components. For example, reference literature 1 described below compares McCann99, PSEUDO, Poisson, and QP models.

In addition, Retinex that extracts reflected light components while estimating that local illumination light components complying with a Gaussian distribution will be called Center/Surround (to be referred to as C/S hereinafter) Retinex. Models typified by this Retinex include, for example, Single Scale Retinex model (to be referred to as SSR hereinafter) and Multiscale Retinex model (to be referred to as MSR hereinafter).

SSR is a model (see, for example, reference literature 2 described below) for extracting luminance components of reflected light corresponding to one scale from an image. MSR is a model (see, for example, reference literature 3 described below) obtained by extending SSR. This model is designed to extract luminance components of reflected light corresponding to a plurality of scales from an image.

[Reference Literature 1] Yoshihiro Nozato et al., "Comparison of Retinex Models for Hardware Implementation", IEICE Technical Report SIS2005-16 (2005)

[Reference Literature 2] D. J. Jobson and G. A. Woodell, "Properties of a Center/Surround Retinex: Part 2. Surround Design, NASA Technical Memorandum, 110188, 1995

[Reference Literature 3] Zia-ur Rahman, Daniel J. Jobson, and Glenn A. Woodell, "Multiscal Retinex for Color Image Enhancement", ICIP'96

Assume, for example, that in Example 1, the first Retinex processing unit 20 uses a McCann99 model excelling in illumination light estimation performance, and the second Retinex processing unit 22 uses an MSR model excelling in contrast correction performance. A feature analyzing unit 24 analyzes the features of the internal image signal 12 and outputs a first image combining control signal 29 and a second image combining control signal 25 to an image combining unit 26. The image combining unit 26 outputs the corrected image signal 13 by combining the corrected image signal 21 and the corrected image signal 23 based on the first image combining control signal 29 and the second image combining control signal 25.

Figure 3:
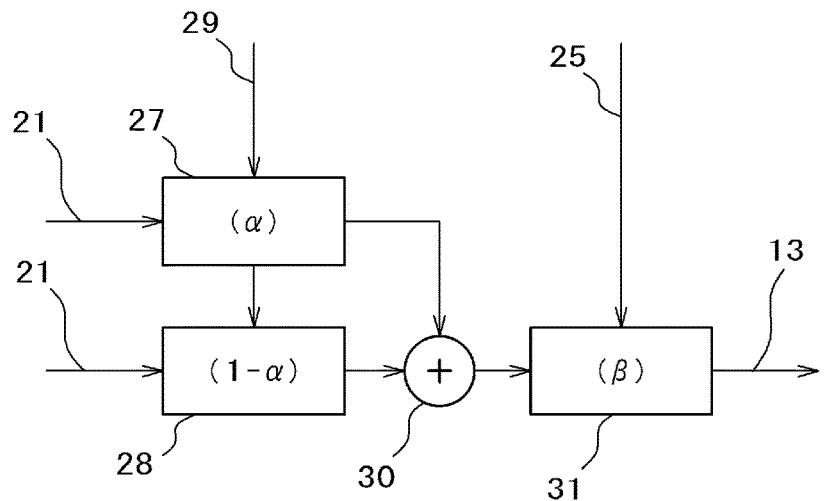
FIG. 3 is a block diagram showing an example of the arrangement of an image combining unit.

FIG. 3 shows an example of the arrangement of the image combining unit 26. A gain control unit 27 multiplies the corrected image signal 21 by α. A gain control unit 28 multiplies the corrected image signal 23 by (1−α). An addition unit 30 adds the resultant signals. A gain control unit 31 multiplies the signal by β to obtain the corrected image signal 13.

An example of the operation of the arrangement shown in FIGS. 1 to 3 will be described next with reference to FIGS. 4A to 4C and 5A to 5F. Control using the first image combining control signal 29 in Example 1 will be described first.

Figure 4A:
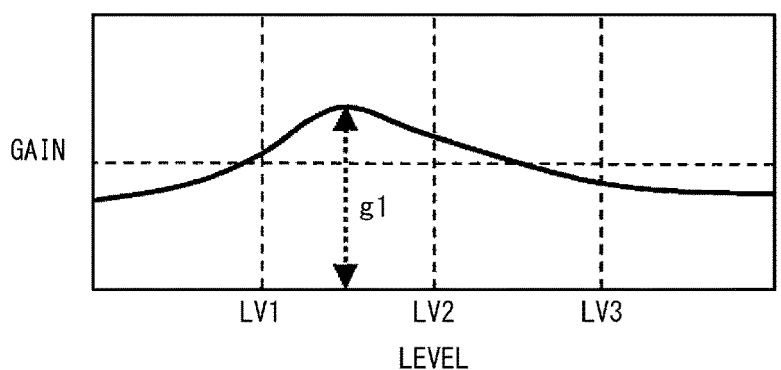
FIG. 4A is a graph showing an example of a characteristic of a first Retinex processing unit.
Figure 4B:
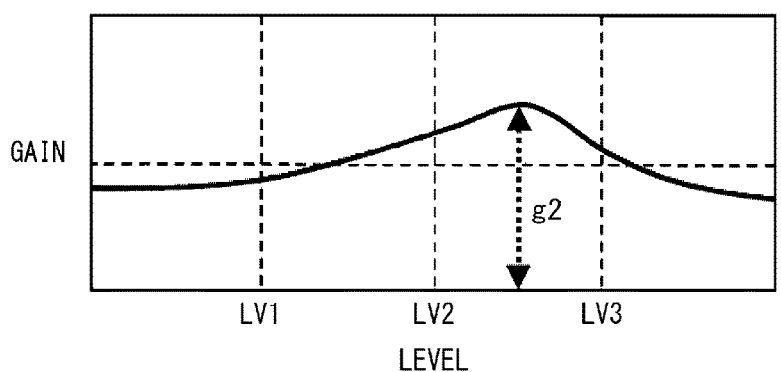
FIG. 4B is a graph showing an example of a characteristic of a second Retinex processing unit.

Referring to each of FIGS. 4A and 4B, the abscissa represents the luminance level, and the ordinate represents the gain. FIGS. 4A and 4B respectively show examples of the gain characteristics of the first and second Retinex processing units 20 and 22 with respect to the luminance levels. FIGS. 4A and 4B exemplify a case in which an McCann99 model is used for the first Retinex processing unit 20, and an MSR model is used for the second Retinex processing unit 22. In the example shown in FIG. 4A, the first Retinex processing unit 20 using the McCann99 model has a gain peak g1 between luminance levels LV1 and LV2. In the example shown in FIG. 4B, the second Retinex processing unit 22 using the MSR model has a gain peak g2 between luminance levels LV2 and LV3.

Figure 4C:
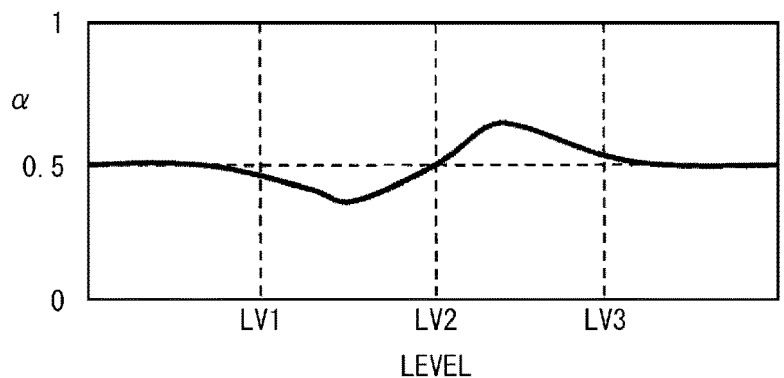
FIG. 4C is a graph showing an example of a characteristic of an image combining control signal.

FIG. 4C is a graph showing an example of a combining control value α based on the first image combining control signal 29 output from the feature analyzing unit 24 shown in FIG. 2 when the first Retinex processing unit 20 and the second Retinex processing unit 22 have the characteristics shown in FIGS. 4A and 4A. The combining control value is controlled in the manner shown in FIG. 4C. At a luminance level at which the gain of the first Retinex processing unit 20 is higher than that of the second Retinex processing unit 22, the combining control value α is decreased. In contrast to this, at a luminance level at which the gain of the first Retinex processing unit 20 is lower than that of the second Retinex processing unit 22, the combining control value α is increased. With this control, the input/output characteristic of a composite output image based on the first Retinex processing unit 20 and the second Retinex processing unit 22, which is output from the addition unit 30, becomes a linear characteristic.

With the above processing, it is possible to obtain a composite image having advantages of both Retinex processing using a McCann99 model excelling in illumination light estimation performance and Retinex processing using an MSR model excelling in contrast correction performance.

Control based on the second image combining control signal 25 in Example 1 will be described next.

Figure 5A:
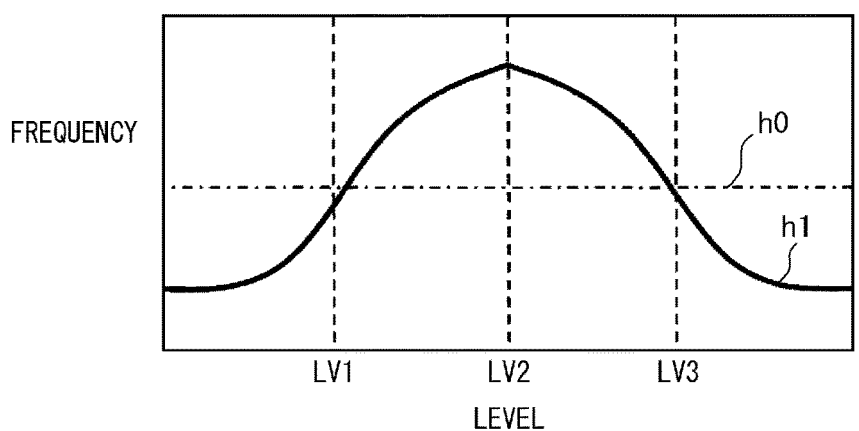
FIG. 5A is a graph showing an example of the luminance histogram of an image.
Figure 5B:
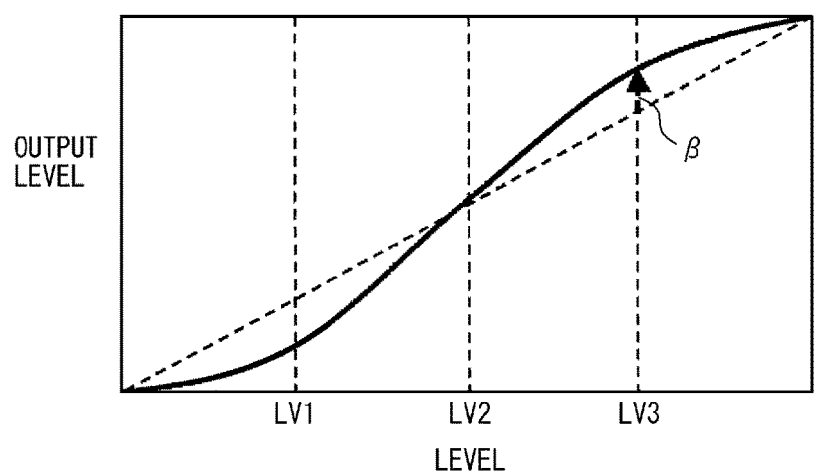
FIG. 5B is a graph showing an example of the input/output characteristic of an image.

FIGS. 5A and 5B show an example of control based on the second image combining control signal 25 output from the feature analyzing unit 24.

First of all, referring to FIG. 5A, the abscissa represents the luminance level of an image, and the ordinate represents the number of pixels in one frame. FIG. 5A is a graph expressing a distribution at each luminance level as a histogram. In the case shown in FIG. 5A, a histogram h1 indicates that the distribution in the range from a luminance level LV1 to a luminance level LV3 is larger than the distributions at luminance levels equal to or lower than LV1 and equal to or higher than LV3. Note that if the distribution in the range from the luminance level LV1 to the luminance level LV3 is flat, a histogram h0 indicated by the alternate long and short dash line is obtained.

Referring to FIG. 5B, the abscissa represents the luminance level of an input image, and the ordinate represents the luminance level of an output image. FIG. 5B shows an example of the second image combining control signal 25 output from the feature analyzing unit 24 when the luminance distribution in FIG. 5A described above is represented by the histogram h1. This example corresponds to an input/output level characteristic controlled by a gain control value β. When the luminance distribution in FIG. 5A is represented by the histogram h0, the characteristic represented by the dotted line in FIG. 5B is obtained. When the luminance distribution in FIG. 5A is represented by the histogram h1, the characteristic represented by the solid line in FIG. 5B is obtained. In this case, β represents a value with reference to the linear characteristic represented by the dotted line (β=1). Changing β in accordance with an input level can obtain a characteristic like that represented by the solid line in FIG. 5B. In the case shown in FIG. 5B, β is 1 at LV2, whereas β is a value smaller than 1 at LV1 and a value larger than 1 at LV3. As described above, in the case of the histogram h1 in FIG. 5A, the input/output level characteristic is controlled by the gain control value β such that the input/output characteristic curve in the range from LV1 to LV3, in which the luminance distribution is large, has a steeper slope than the slopes in other regions. Obtaining the corrected image signal 13 with such a characteristic will assign more output luminance levels to regions in an image in which distributions are large, thereby obtaining an image with good visibility.

FIGS. 5C to 5F are graphs for explaining an example of control when the luminance distributions are different from the distribution shown in FIG. 5A.

First of all, FIG. 5C shows an example of a histogram when luminance distribution at luminance levels equal to or lower than LV2 is larger than that at luminance levels equal to or higher than LV2. FIG. 5D shows an example of the gain control value β in this case. As shown in FIG. 5D, more output luminance levels are assigned to a luminance band with a large image distribution by controlling the gain control value β such that the slope of the characteristic curve at luminance levels equal to or lower than LV2, at which the luminance distribution is large, is made steeper than that at luminance levels equal to or higher than LV2. This makes it possible to obtain an image with good visibility.

Figure 5F:
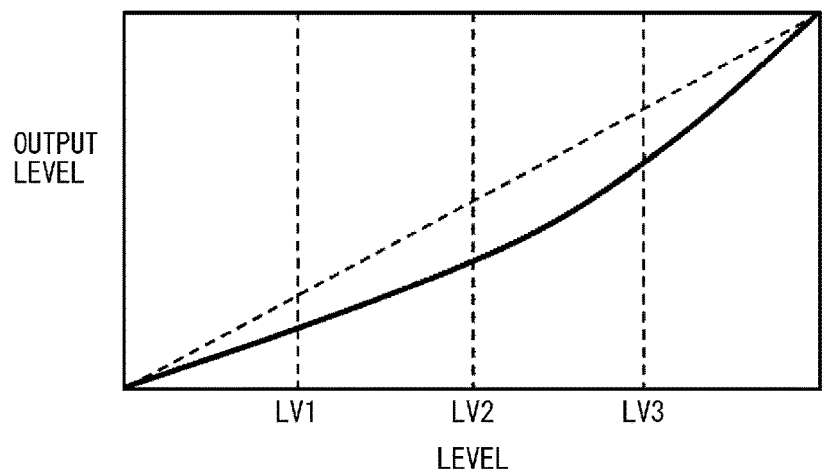
FIG. 5F is a graph showing an example of the input/output characteristic of an image.

Next, FIG. 5E shows an example of a histogram when luminance distribution at luminance levels equal to or higher than LV2 is larger than that at luminance levels equal to or lower than LV2. FIG. 5F shows an example of the gain control value β in this case. As shown in FIG. 5F, more output luminance levels are assigned to a luminance band with a large image distribution by controlling the gain control value β such that the slope of the characteristic curve at luminance levels equal to or higher than LV2, at which the luminance distribution is large, is made steeper than that at luminance levels equal to or lower than LV2. This makes it possible to obtain an image with good visibility.

With the series of control operations by the image combining unit 26 described above, it is possible to obtain a corrected image having advantages of both Retinex processing using a McCann99 model excelling in illumination light estimation performance and Retinex processing using an MSR model excelling in contrast correction performance, while obtaining good visibility.

Note that the above combination of the Retinex models in the above description is not exhaustive, and a combination of Retinex models based on different methods may be used. In addition, models to be combined are not limited to models based on two methods, and three or more models may be combined. In this case, the plurality of Retinex processing units shown in FIG. 2 may be arranged in parallel, and the image combining unit 26 may combine corrected images from the respective Retinex processing units to obtain the corrected image signal 13.

Example 2

Example 2 differs from Example 1 in the operation of the image correction unit 100 in the image display device in FIG. 1. Differences from Example 1 will be described below. Portions which are not specifically described are the same as those in Example 1, and hence a description of them will be omitted.

An image correction unit 100 according to Example 2 will be described with reference to FIG. 2. A first Retinex processing unit 20 and a second Retinex processing unit 22 respectively perform image processing based on Retinex theories based on different methods with respect to an internal image signal 12 to output a corrected image signal 21 and a corrected image signal 23. Assume that the second Retinex processing unit 22 performs Retinex processing with a larger scale than that of Retinex processing performed by the first Retinex processing unit 20. In this case, the scale of Retinex processing indicates the size of a pixel range to be referred to in Retinex processing.

A feature analyzing unit 24 analyzes the features of the internal image signal 12 and outputs a first image combining control signal 29 and a second image combining control signal 25 to an image combining unit 26. The image combining unit 26 outputs a corrected image signal 13 by combining the corrected image signal 21 and the corrected image signal 23 based on the image combining control signal 29 and the image combining control signal 25.

In this case, the second image combining control signal 25 and a gain control value β in Example 2 are then same as those in Example 1, and hence a description of them will be omitted.

A gain control value α based on the first image combining control signal 29 in Example 2 is different from that in Example 1. This value will be described below.

Figure 6:
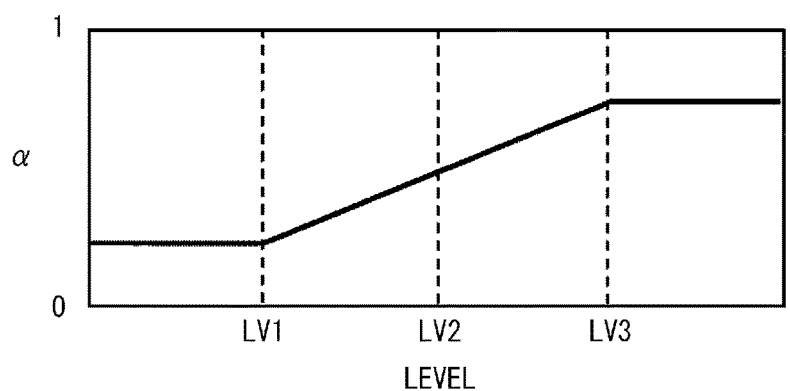
FIG. 6 is a graph showing an operation characteristic of a feature analyzing unit.

FIG. 6 shows an example of the output characteristic of a first image combining control signal in the feature analyzing unit 24 in Example 2. Referring to FIG. 6, the abscissa represents the luminance level of an image, and the ordinate represents the value of the first image combining control signal 29. As shown in FIG. 6, for example, when the luminance level is low, α is decreased, and the opposite is true. Controlling α in this manner can change a combining ratio in accordance with a luminance level. If the luminance level represented by the corrected image signal 13 obtained by the image combining unit 26 is low, the ratio of the second Retinex processing unit 22 can be increased. In addition, if the luminance level is high, the ratio of the first Retinex processing unit 20 can be increased. That is, since a signal from the first Retinex processing unit 20 with a small Retinex processing scale contains many reflected light components of relatively high frequency components, the fineness of an image can be improved by increasing the combining ratio in a high-luminance image region. In addition, since a signal from the second Retinex processing unit 22 with a large Retinex processing scale contains many reflected light components of relatively low frequency components, the visibility of a shadow portion of an image can be improved by increasing a combining ratio in a low-luminance image region. Note that the characteristic shown in FIG. 6 is an example, and the maximum value, the minimum value, the slope of a characteristic, and the like at each luminance level may be determined in accordance with the characteristics of Retinex processing.

Example 2 described above has exemplified the case in which the image combining control signal 29 is generated in accordance with the luminance level of an image. However, control may be performed in accordance with frequency components. Assume that control is performed in accordance with frequency components. In this case, if, for example, frequency components in each region of an image signal are high, the ratio of an image signal, of the corrected image signal 13, which is obtained from the Retinex processing unit with a small scale size is increased. If frequency components in each region of an image signal are low, the ratio of an image signal, of the corrected image signal 13, which is obtained from the Retinex processing unit with a large scale size is increased. In addition, combining control may be performed by using both the luminance levels and frequency components of an image. In this case, for example, control may be performed by using a value normalized by adding or integrating the above control value corresponding to a luminance level and a control value corresponding to a frequency component.

According to Example 2 of the present invention described above, it is possible to satisfy both the requirements for the fineness of an image and the visibility of a shadow portion by combining corrected images obtained by different types of Retinex processing in accordance with the scales of the respective types of Retinex processing.

Example 3

Figure 7:
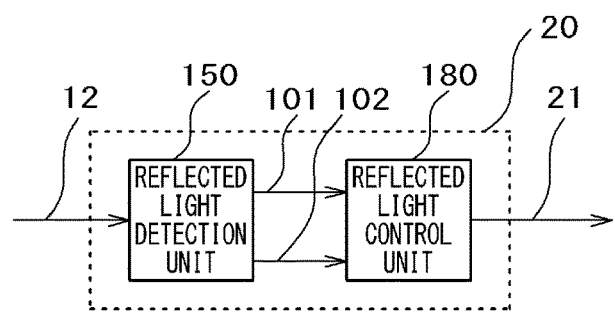
FIG. 7 is a block diagram showing an example of the arrangement of a Retinex processing unit according to Example 3 of the present invention.

Example 3 using different Retinex models for an image correction unit 100 in the image display device shown in FIG. 1 will be described next. Although the arrangement shown in FIG. 2 is used as an example of the arrangement of the image correction unit 100, this is not exhaustive. FIG. 7 shows an example of the arrangement of a first Retinex processing unit 20, which includes a reflected light detection unit 150 which receives an internal image signal 12 as an input signal, and performs image processing based on a Retinex theory to detect two reflected light components 101 and 102 and a reflected light control unit 180 which receives the two detected reflected light components and combines them upon adjustment of the reflected light to output a corrected image signal 13.

The reflected light detection unit 150 and the reflected light control unit 180 will be described next.

Light reflections are classified as follows in accordance with the properties of objects, for example: light (to be referred to as specular hereinafter) specularly reflected by a smooth surface like a mirror; light (to be referred to as diffuse hereinafter) diffusely reflected by microscopic asperities on a rough surface; and ambient light (to be referred to as ambient hereinafter) scattered upon repeated reflection and the like by a surrounding environment.

In the field of three-dimensional computer graphics, for example, there is available a Phong reflection model as a reflection model expressing the shadow of the surface of an object by using the properties of these three types of light. According to the Phong reflection model, a material can be expressed by the manner of light reflection.

For example, when spot light is applied to a plastic sphere, a high-luminance circular small highlight is formed. When spot light is applied to a rubber sphere, a highlight has a larger radius than that on the plastic sphere but has a lower luminance. This highlight portion is specular. In addition, diffuse and ambient differ in luminance depending on materials.

Figure 10:
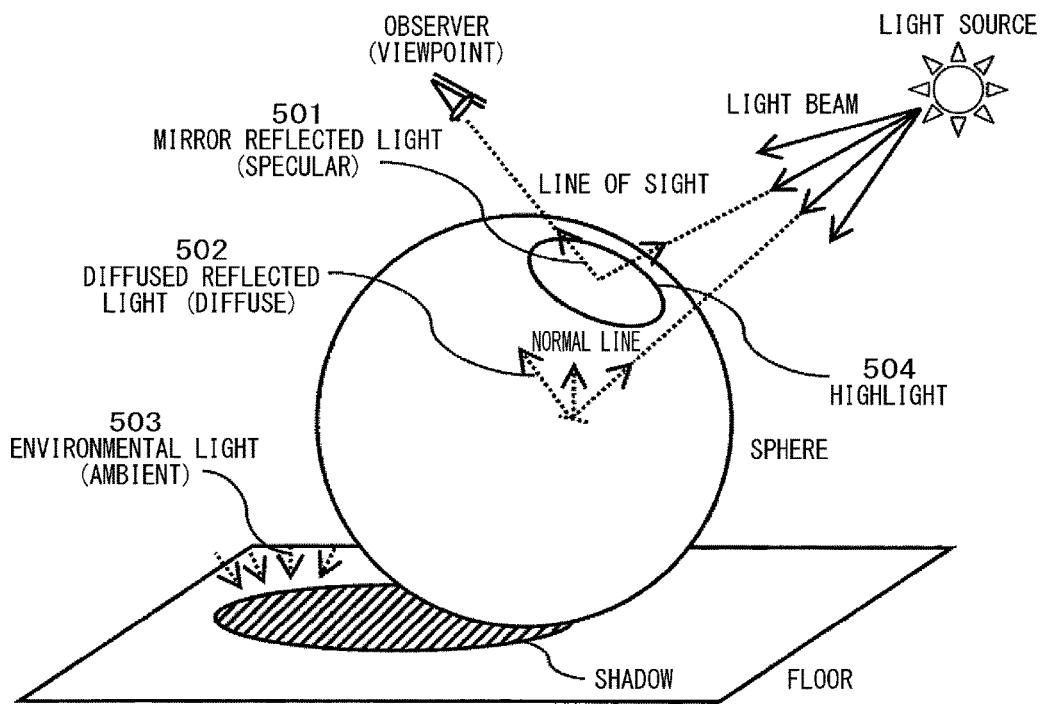
FIG. 10 is a view for explaining properties of reflected light based on the Phong reflection model.

FIG. 10 is a view for explaining an example of a Phong reflection model. FIG. 10 is constituted by a light source, light beams extending from the light source, a sphere at which the light beams have arrived, a floor on which the sphere is placed, and an observer who observes this condition. Observation is performed at the position of a viewpoint, and may be performed by the naked eye or through an observation device such as a camera.

Referring to FIG. 10, the specular is light 501 which is a light beam reflected by the sphere surface along the line of sight, and is a reflection of the light source in the sphere surface. A circular highlight 504 in FIG. 10 indicates the range of the specular. In the case of a plastic sphere, for example, a high-luminance circular small highlight is formed. In the case of a rubber sphere, a highlight is formed to have a larger radius and lower luminance than that formed on a plastic sphere. The Phong reflection model assumes that specular will comply with the power of the cosine between the line of sight and reflected light.

Referring to FIG. 10, diffuse is light 502 which is a light beam incident on the sphere surface and diffused and reflected. The luminance of diffuse is determined by the directions of a light beam and the sphere surface, that is, the cosine between the light beam and the normal line, and hence a portion, of the sphere surface, which light directly strikes is the range of the diffuse.

Referring to FIG. 10, ambient is light 503 which goes around a shadow portion. This light appears when light repeatedly reflected and scattered by the surrounding is averaged throughout the environment and stays there, and hence even a shadow portion which light does not directly reach has a constant luminance. Ambient is diffused/reflected light forming a shadow. The brightness of ambient is determined by the directions of a light beam and the sphere surface, that is, the cosine between a light beam vector and the normal line.

As described above, the Phong reflection model is expressed by the following equation.

$$I = k_d \sum_{j=1}^{l} (\vec{N} \cdot \vec{L}) m_d + k_s \sum_{j=1}^{l} (\vec{R} \cdot \vec{V})^n I_j + I_a \qquad \text{[Math 1]}$$

Assume therefore that reflected light in the reflected light detection unit in Example 3 is constituted by ambient, diffuse, and specular, and that ambient in an image complies with a wide-scale Gaussian distribution, diffuse complies with a luminance distribution in the form of a cosine distribution, and specular complies with a luminance distribution in the form of a raised cosine distribution. Letting Fa(x, y) represent an ambient filter, Fd (x, y) represents a diffuse filter, and Fs(x, y) represents a specular filter, the respective filters are expressed by the following equations.

$$F_a(x, y) = \frac{1}{\sqrt{2\pi}\,\sigma} e^{-\frac{x^2+y^2}{2\sigma^2}} \qquad \text{[Math 2]}$$

$$F_d(x, y) = \cos\left(\frac{\pi\sqrt{x^2+y^2}}{k}\right) / N \qquad \text{[Math 3]}$$

$$F_s(x, y) = \cos^n\left(\frac{\pi\sqrt{x^2+y^2}}{k}\right) / N^n \qquad \text{[Math 4]}$$

Figure 11C:
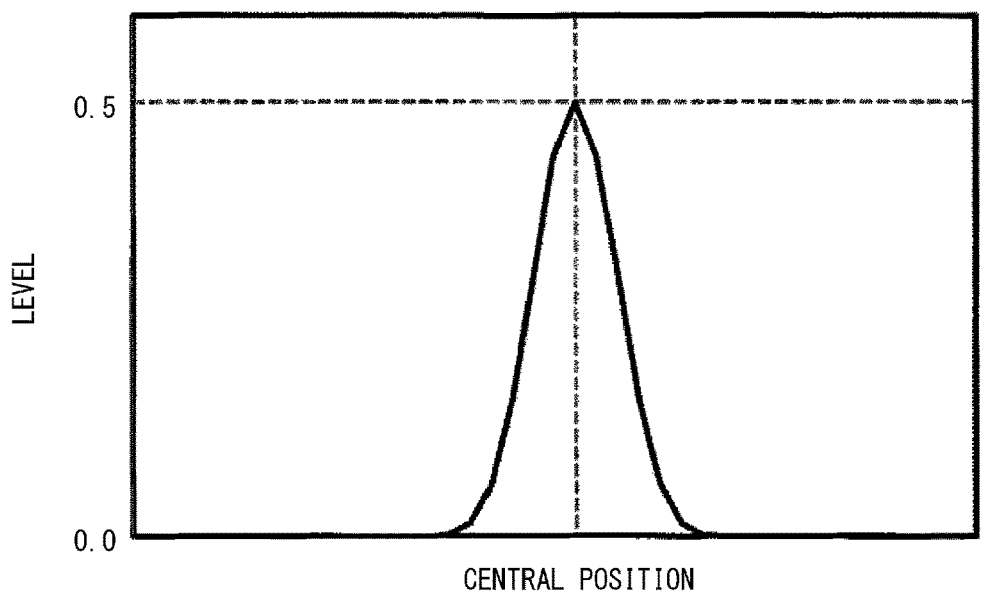
FIG. 11C a graph for explaining a luminance distribution in the form of a raised cosine distribution.

In addition, FIGS. 11A, 11B, and 11C are graphs for respectively explaining ambient, diffuse, and specular distributions, with each ordinate representing the luminance level, and each abscissa representing the one-dimensional positional coordinates. As is obvious, the diffuse and specular distributions decrease in level steeply as compared with the Gaussian distribution of ambient.

In this case, an image Ia obtained by the ambient filter contains almost only ambient components because of the averaging of overall light. An image Id obtained by the diffuse filter contains almost only ambient and diffuse components because of the averaging of specular components by the filter. In an image Is obtained by the specular filter, all ambient, diffuse, and specular components are left because they are hardly averaged. This state is expressed by equations (5).

Ambient=$I_a$,Diffuse=$I_d$-$I_a$,Specular=$I_x$-$I_d$ [Math 5]

Using this, logarithmic-space reflection components are calculated in the same manner as in MSR according to equations 6.

$R_{Phong,i}(x,y)=W_d R_{Diffuse,i}(x,y)+W_s R_{Specular,i}(x,y)$ $R_{Specular,i}(x,y)=\log \bar{I}_{s,i}(x,y)-\log \bar{I}_{d,i}(x,y)=\log [F_s(x,y) \otimes I(x,y)]-\log [F_d(x,y) \otimes I(x,y)]$ $R_{Diffuse,i}(x,y)=\log \bar{I}_{d,i}(x,y)-\log \bar{I}_{a,i}(x,y)=\log [F_d(x,y) \otimes I(x,y)]-\log [F_a(x,y) \otimes I(x,y)]$ [Math 6]

Specular from a mirror, metal, or the like is considered to be total reflection, and hence a raised cosine value becomes infinite.

At this time, the specular reflection component may also be represented by Equation 7.

$R_{Specular,i}(x,y)=\log I(x,y)-\log [F_d(x,y) \otimes I(x,y)]=\log I_i(x,y)-\log \bar{I}_{d,i}(x,y)$ [Math 7]

Since ambient is average light in the entire environment, either an average value filter or an average luminance may be used in place of a Gaussian filter. For example, when using the average luminance, Equation 8 is given.

$R_{Diffuse,i}(x,y)=\log \bar{I}_{d,i}(x,y)-\log [\Sigma I(x,y)/\text{num}]=\log \bar{I}_{d,i}(x,y)-\log \bar{I}_{a,i}(x,y)$ [Math 8]

Figure 12A:
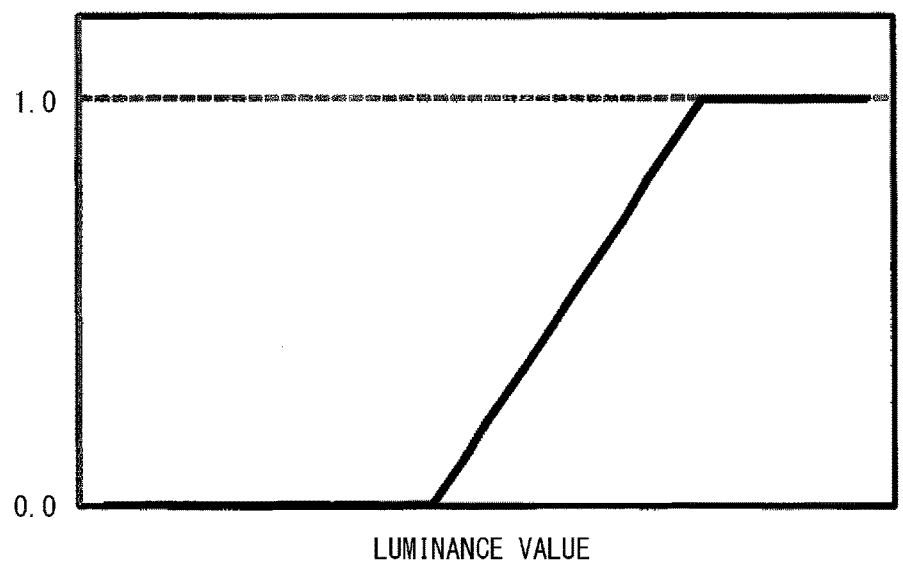
FIG. 12A is a graph for explaining a specular correction gain based on the luminance value of an image.
Figure 12B:
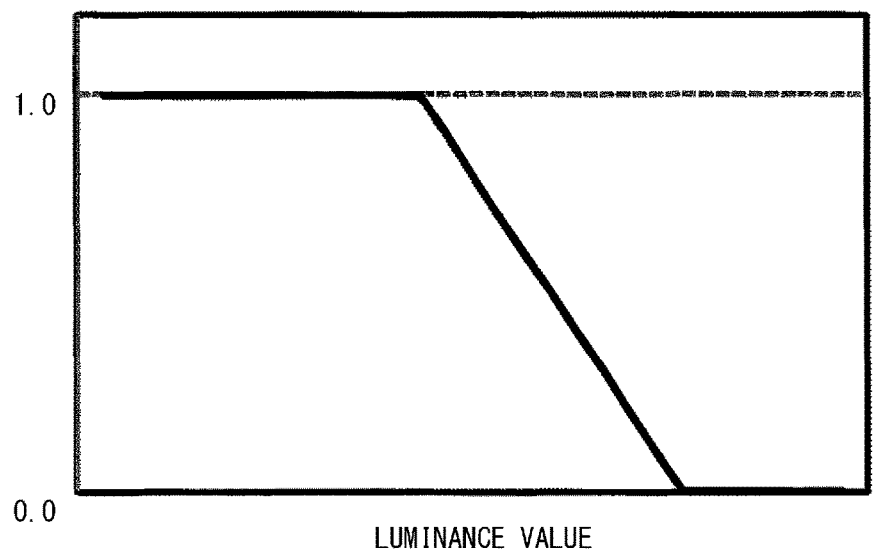
FIG. 12B is a graph for explaining a diffuse correction gain based on the luminance value of an image.

Specular is noticeable because it is often a high-luminance highlight, and diffuse often has middle or low luminance. For this reason, for example, the gain of a high-luminance region like that shown in FIG. 12A may be added to the specular Rspecular of Equations 6, whereas the gain of a middle/low-luminance region like that shown in FIG. 12B may be added to the diffuse Rdiffuse. In this case, letting g(l) be an input/output curve in FIG. 12A, the gain becomes 0 when the input luminance l is low. The gain gradually increases from middle luminance. At high luminance, the gain becomes 1. The input/output curve in FIG. 12B is represented by 1−g(l). When the luminance is low, the gain is 1. The gain gradually decreases from middle luminance. At high luminance, the gain becomes 0.

In a similar manner to the case of MSR, Equations 6 represent a homomorphic filter when adding a gain and exponential function after execution of the weighted averaging. For this homomorphic filter, the logarithmic and exponential functions may be approximated by, for example, a power-used function and its inverse function. In this case, when using a function f, Equations 9 are given.

$$R_{Phong,i}(x,y)=W_d R_{Diffuse,i}(x,y)+W_s R_{Specular,i}(x,y)$$

$$R_{Specular,i}(x,y)=f(F_s(x,y)\otimes I(x,y))-f(F_d(x,y)\otimes I(x,y))=f(\overline{I}_{s,i}(x,y))-f(\overline{I}_{d,i}(x,y))$$

$$R_{Diffuse,i}(x,y)=f(F_d(x,y)\otimes I(x,y))-f(F_a(x,y)\otimes I(x,y))=f(\overline{I}_{d,i}(x,y))-f(\overline{I}_{a,i}(x,y))$$

[Math 9]

As described above, it is possible to perform correction by using the Phong reflection model in consideration of the properties of reflection.

Equations (9) will be described with reference to FIGS. 8 and 9.

Figure 8:
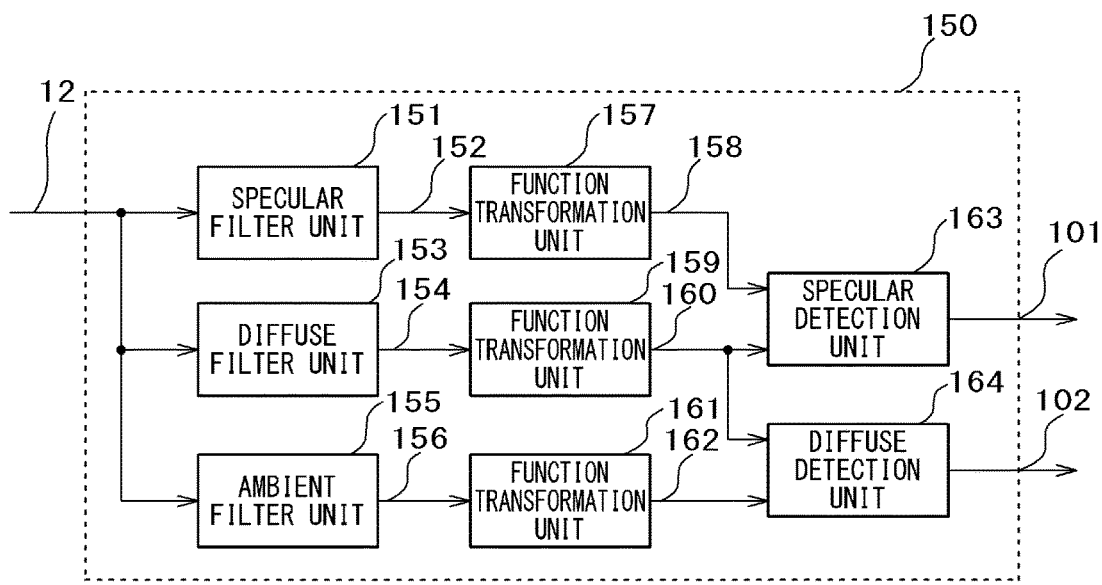
FIG. 8 is a block diagram showing an example of the arrangement of a reflected light detection unit.

FIG. 8 is a block diagram for explaining processing by the reflected light detection unit according to Example 3. The reflected light detection unit 150 includes a specular filter unit 151, a diffuse filter unit 153, an ambient filter unit 155, function transformation units 157, 159 and 161, a specular detection unit 163, and a diffuse detection unit 164. Note that the function transformation units may be logarithm functions or may be approximated by power functions.

Figure 9A:
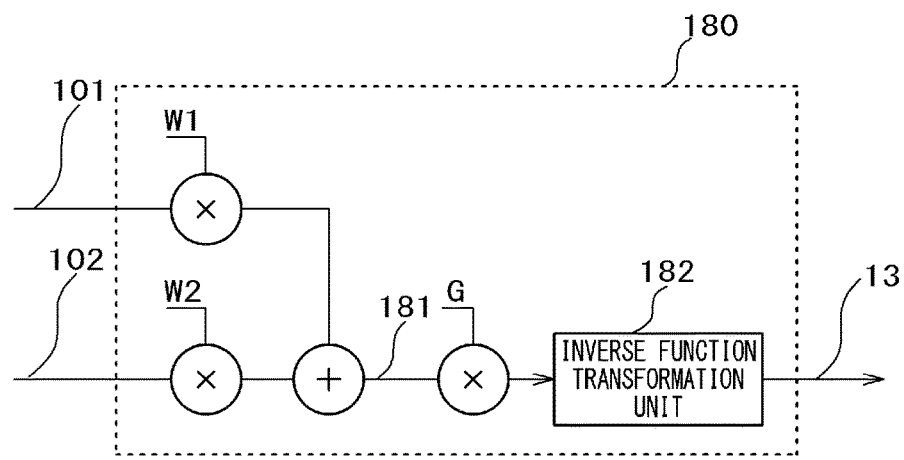
FIG. 9A is a block diagram showing an example of the arrangement of a reflected light control unit.
Figure 9B:
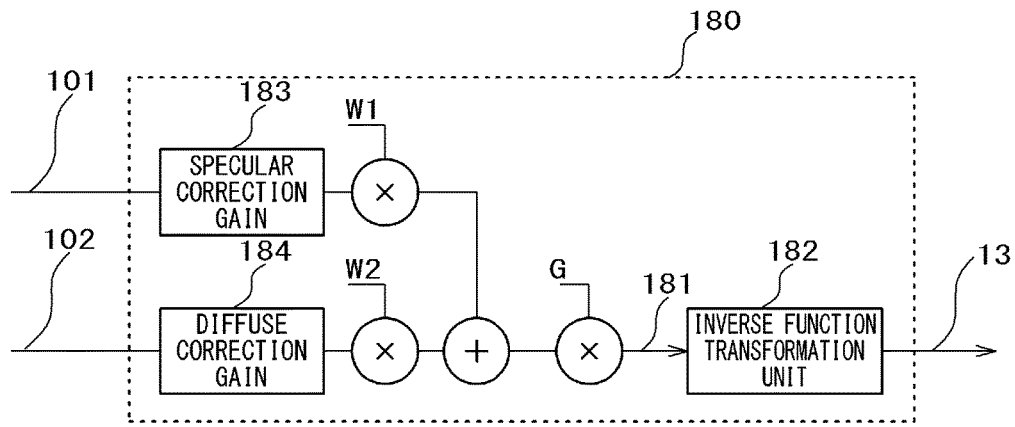
FIG. 9B is a block diagram showing an example of the arrangement of the reflected light control unit.

FIG. 9A is a block diagram for explaining processing by the reflected light control unit according to Example 1. The reflected light control unit 180 may include weighted averaging units using weights W1 and W2 or may include the weighted averaging units using weights W1 and W2, a gain G, and an inverse function transformation unit 182. Note however that the inverse function transformation unit is the inverse function of the function used in the function transformation unit. In addition, as shown in FIG. 9B, the arrangement shown in FIG. 9A may additionally include a specular correction gain 183 having a high gain in the high luminance region in FIG. 12A and a diffuse correction gain 184 having a high gain in the middle/low luminance region in FIG. 12B.

According to the arrangement described above, when extracting reflected light components, it is possible to obtain the first corrected image signal 21 representing high texture quality in consideration of the material of an object in an image from the first Retinex processing unit 20 by decomposing the image for the respective properties of light reflection, i.e., for specular, diffuse, and ambient, and changing the correction amount in accordance with the respective properties.

Assume then that the second Retinex processing unit 22 performs image correction using an MSR model. In this case, the second Retinex processing unit 22 performs processing using a larger scale size than that used by the first Retinex processing unit 20.

With the above arrangement, the first corrected image signal 21 becomes an image signal obtained in consideration of the properties of the object, and the second corrected image signal 23 becomes an image signal obtained by contrast correction on a relatively large area of the image. These corrected image signals are combined by an operation similar to that of the image combining unit 26 described in Example 2. With this operation, in a region, of the image, in which the luminance level of the image is low, the ratio of the second corrected image signal can be increased, and hence the contrast improvement effect can be increased. In a region in which the luminance level of the image is high, since the ratio of an image corrected signal obtained in consideration of the properties of the object can be increased, and hence it is possible to obtain an image with good visibility throughout the entire band of the luminance levels of the image as the corrected image signal 13.

Example 3 of the present invention described above can obtain an output image with higher texture quality in addition to the effects of Example 2 described above.

Example 4

Example 4 will exemplify adaptive control giving consideration to outside light in an image display device according to the present invention in a usage environment.

Figure 13:
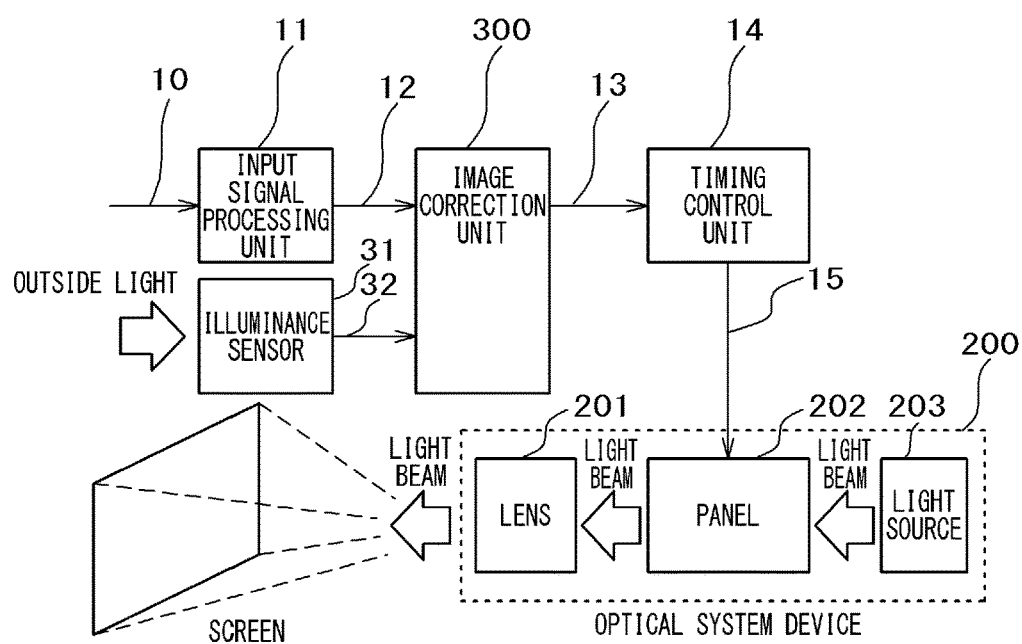
FIG. 13 is a block diagram showing an example of the arrangement of an image display device according to Example 4 of the present invention.

FIG. 13 shows an example of the arrangement of an image display device according to Example 4.

This image display device includes an input signal processing unit 11 which receives an image input signal 10 and converts it into an internal image signal 12 by using, for example, a compressed image signal decoder, IP conversion, or scaler, an illuminance sensor 31 which receives outside light and outputs, for example, an illuminance level signal 32 with 256 level steps, an image correction unit 300 which receives the internal image signal 12 and the illuminance level signal 32, a timing control unit 14 which receives a corrected image signal 33 and generates a display control signal 15 based on the corrected image signal and horizontal/vertical synchronization signals for a display screen, and an optical system device 200 which displays an image.

Figure 14:
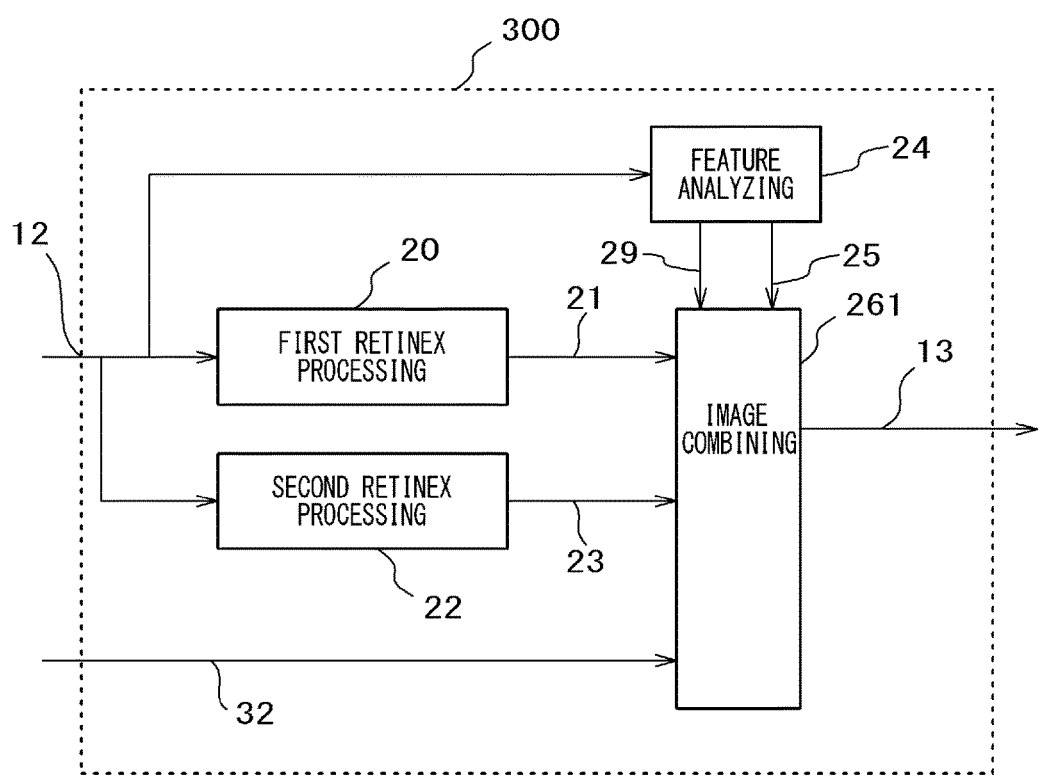
FIG. 14 is a block diagram showing an example of the arrangement of an image correction unit.

FIG. 14 shows an example of the arrangement of the image correction unit 300. An image combining unit 261 adaptively combines a first corrected image signal 21 and a second corrected image signal 23 in accordance with a first image combining control signal 29, a second image combining control signal 25, and the illuminance level signal 32, and outputs the resultant signal as a corrected image signal 13.

Figure 15:
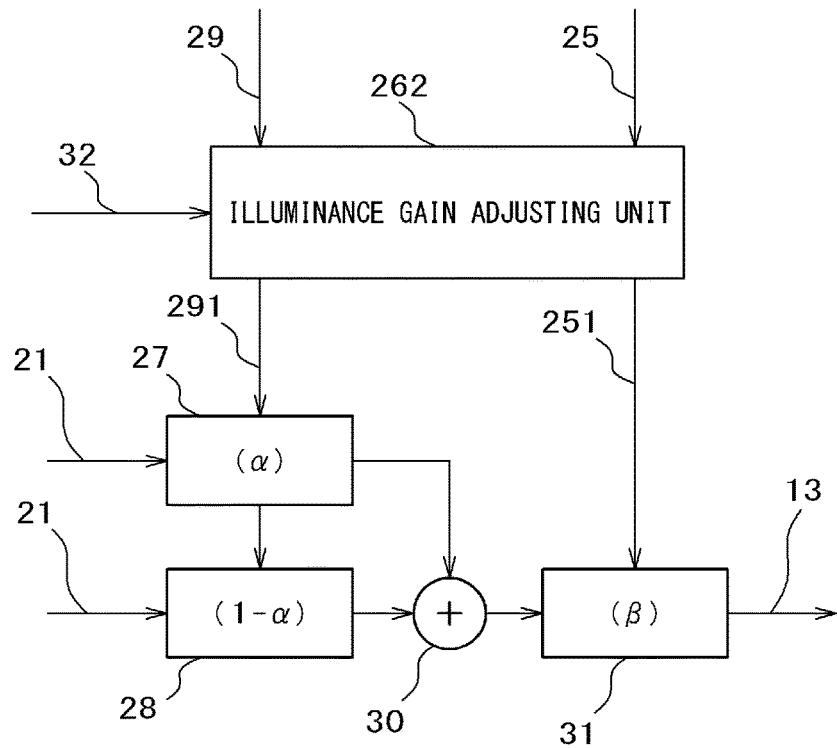
FIG. 15 is a block diagram showing an example of the arrangement of an image combining unit.

FIG. 15 shows an example of the arrangement of the image combining unit 261. An illuminance gain adjusting unit 262 adjusts the first image combining control signal 29 and the second image combining control signal 25 in accordance with the illuminance level signal 32. The illuminance gain adjusting unit 262 then outputs the resultant signals as a second illuminance-corrected signal 251 and a first illuminance-corrected signal 291, respectively, which are then added to gain control units 27, 28, and 31, as shown in FIG. 15. This determines the combining characteristics of the corrected image signal 13.

In the above arrangement, first of all, if, for example, the illuminance is high, the first image combining control signal 29 is corrected in accordance with illuminance level signal 32 so as to increase the combining ratio of the Retinex processing unit with a small scale size, thereby output the first illuminance-corrected signal 291. That is, in the arrangement example described in Example 2, an offset may be added in a direction to increase the a value shown in FIG. 6.

Figure 16:
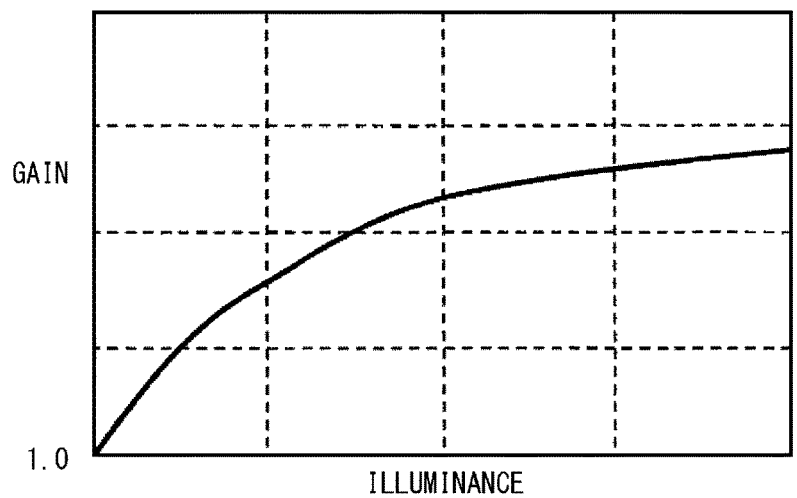
FIG. 16 is a graph showing an example of a control characteristic based on illuminance.

In accordance with the magnitude of the illuminance level signal 32, the second image combining control signal 25 is then formed into the second illuminance-corrected signal 251 by, for example, calculating the product of the signal 25 and the gain control signal shown in FIG. 16. With this operation, when the ambient illuminance is low, the gain control value β decreases to reduce the correction amount of an image, thereby playing back an image close to the original image. When the illuminance is high, the gain control value increases to increase the correction amount of an image, thereby improving the visibility of the image in a bright environment. This correction method is not exhaustive. For example, an offset may be added to the second image combining control signal 25 in accordance with the illuminance level signal 32. That is, control may be performed to increase the correction amount in a bright environment in accordance with an illuminance level.

According to Example 4 of the present invention described above, the visibility of an image can be improved even in a bright environment by controlling image processing in consideration of the influence of outside light.

Example 5

Figure 17:
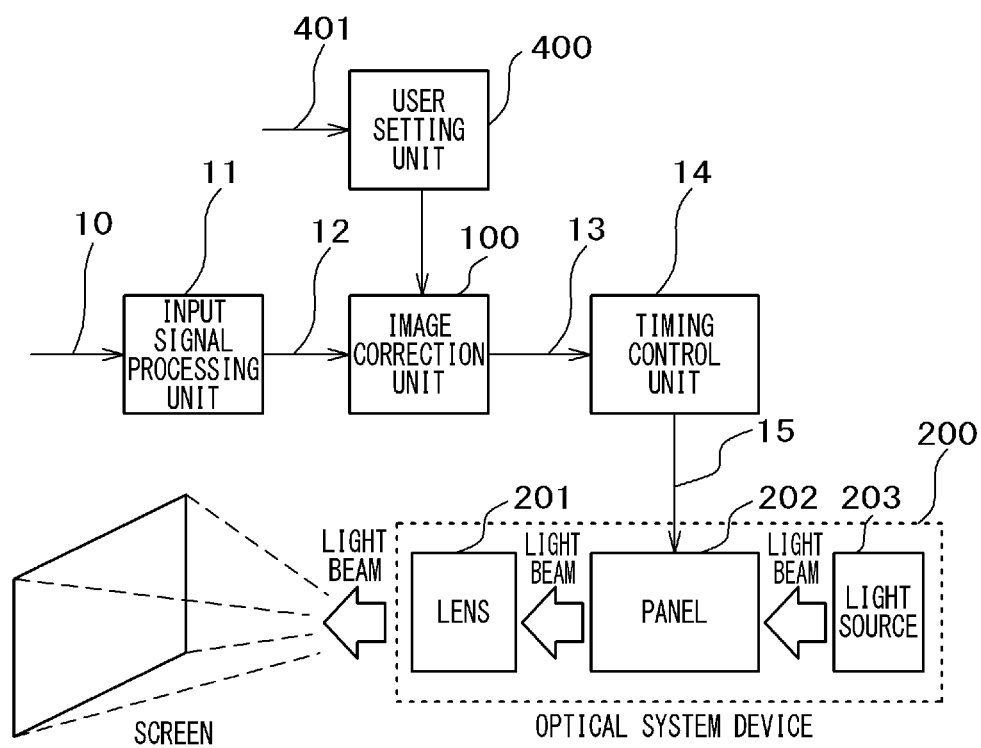
FIG. 17 is a block diagram showing an example of the arrangement of an image display device according to Example 5 of the present invention.

Example 5 will exemplify a control method when a user sets correction characteristics in the image display device according to the present invention. FIG. 17 shows an example of the arrangement of Example 5, which is provided with a user setting unit 400. The user setting unit 400 is configured to receive an operation signal 401 from the user via an operation on an operation button on a remote controller or the device body and output an operation instruction signal to an image correction unit 100 in accordance with an operation signal so as to set information indicating whether to perform correction or a correction amount in image processing in the image display device. This makes it possible to make setting to switch an image to be displayed on a display unit to a state desired by the user.

Although FIG. 17 exemplarily shows the arrangement of the image display device in FIG. 1 provided with the user setting unit 400, this is not exhaustive. An example of arrangement of the image display device having the illuminance sensor shown in FIG. 13 may be provided with the user setting unit 400. That is, Example 5 may be applied to any of Examples described above.

Figure 18:
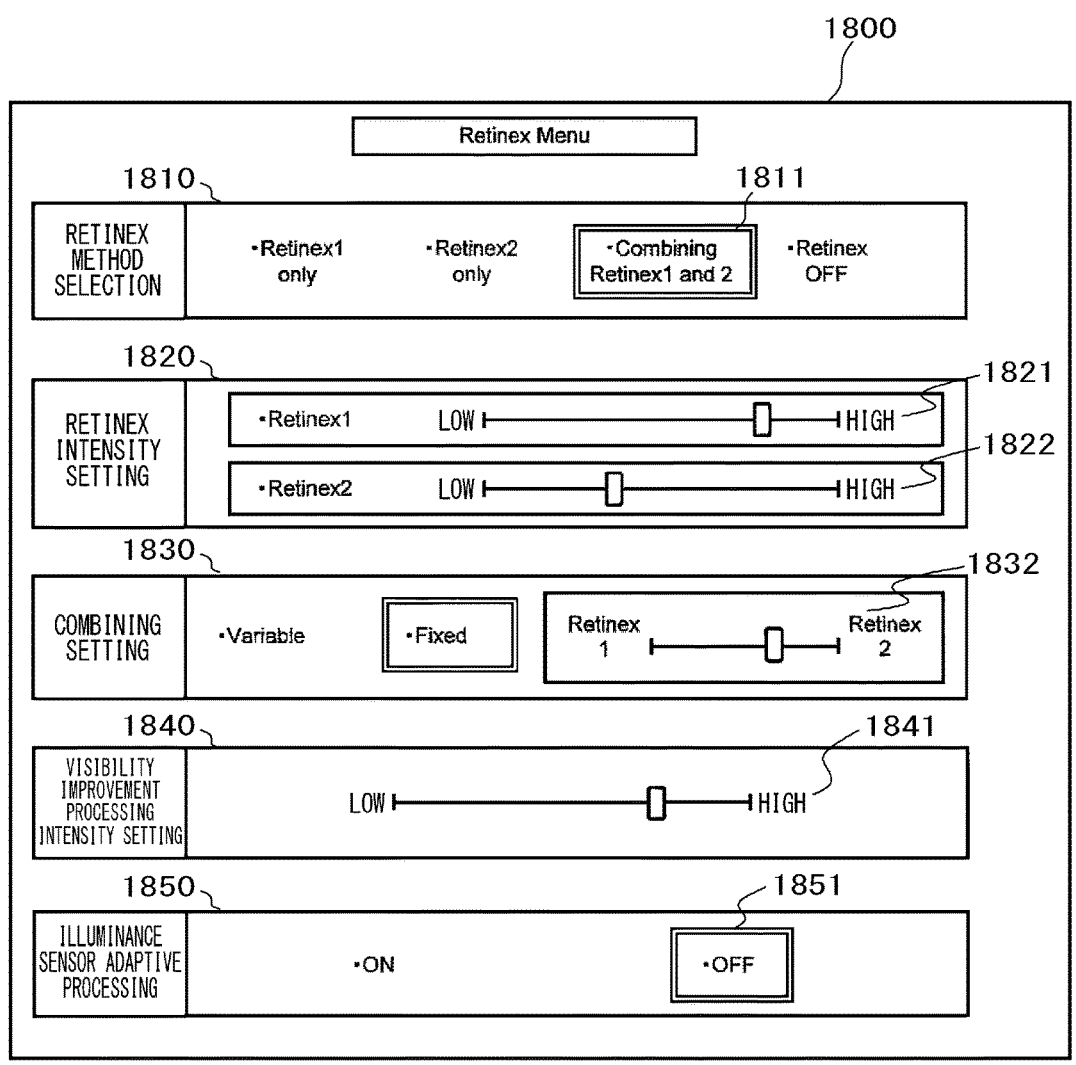
FIG. 18 is a view showing an example of a setting menu screen according to Example 5 of the present invention.

FIG. 18 exemplifies setting items which can be set by the user setting unit according to Example 5 using a setting menu screen 1800 displayed by the image display device.

The setting menu screen 1800 is generated by a menu screen signal generation unit (not shown) of the image display device and output in place of a corrected image signal 13. Alternatively, the setting menu screen 1800 is output while being superimposed on the corrected image signal 13.

The item "Retinex Method Selection" 1810 in an example of the setting menu screen 1800 will be described. With the item "Retinex Method Selection" 1810, it is possible to select whether it is necessary to use Retinex processing by both of the first Retinex processing unit 20 and the second Retinex processing unit 22 described in each Example. Selection is performed by moving a cursor 1811 through an operation on an operation button on the remote controller or the device body. A selected item and corresponding processing will be described. For example, when the item "Retinex 1 only" is selected, only processing by the first Retinex processing unit 20 is applied to processing by the image correction unit, and processing by the second Retinex processing unit 22 is not applied to the processing by the image correction unit. More specifically, a combining control value α may be set to 1, or the operation of the second Retinex processing unit 22 itself may be turned off. Next, on the contrary, when the item "Retinex 2 only" is selected, only processing by the second Retinex processing unit 22 is applied to processing by the image correction unit, and processing by the first Retinex processing unit 20 is not applied to the processing by the image correction unit. More specifically, the combining control value α may be set to 0, or the operation of the first Retinex processing unit 20 itself may be turned off. When the selection item "Combining Retinex 1 and 2" is selected, processing by the first Retinex processing unit 20 and processing by the second Retinex processing unit 22 are combined, and the resultant data is output as described above in Example described above. When the selection item "Retinex OFF" is selected, both of processing by the first Retinex processing unit 20 and processing by the second Retinex processing unit 22 are not applied to processing by the image correction unit. The operations of both the units may be turned off, or an image input to the image correction unit may be output while bypassing the image correction unit.

In the item "Retinex Method Selection" 1810 described above, it is not always necessary to present the above four selection items to the user. For example, only two selection items "Combining Retinex 1 and 2" and "Retinex OFF" may be presented. Alternatively, three selection items "Combining Retinex 1 and 2", "Retinex 1 only", and "Retinex OFF" may be presented. That is, at least two items of the exemplified items may be presented.

An item "Retinex Intensity Setting" 1820 of the example of the setting menu screen 1800 will be described next. In the item "Retinex Intensity Setting" 1820, the intensity of each Retinex processing can be set. More specifically, the intensity of each Retinex processing is set by moving slide bars 1821 and 1822 through an operation on an operation button on the remote controller or the device body. Processing in this case can be implemented by, for example, adding an offset to the gain of each Retinex processing shown in FIGS. 4A and 4B in accordance with the intensity. For example, a positive offset is added to the gain shown in FIGS. 4A and 4B when the intensity is high, and a negative offset is added when the intensity is low. Such processing of adding the offset can be implemented by inserting the processing of adding the offset into the first Retinex processing unit 20 and the second Retinex processing unit 22, or inserting it to a corrected image signal 21 and a corrected image signal 23.

Note that the item "Retinex Intensity Setting" 1820 may be configured to switch between an active state and an inactive state in accordance with the selected state of the item "Retinex Method Selection" 1810. That is, the slide bar for processing turned off in the item "Retinex Method Selection" 1810 may be the inactive state.

The item "Combining Setting" 1830 on the example of the setting menu screen 1800 will be described next. In the item "Combining Setting" 1830, the combining ratio of each Retinex processing can be set. This operation is implemented by controlling the value α described in each Example described above. More specifically, first of all, the user can select either "Variable" or "Fixed" by moving a cursor 1831 through an operation on an operation button on the remote controller or the device body. When "Variable" is selected, the combining control value α can be changed in accordance with the input image signal as described in each Example described above. When "Fixed" is selected, the combining control value α is not changed in accordance with the input image signal, but fixed to the state selected by the user. More specifically, the user adjusts a slide bar 1832 through an operation on an operation button on the remote controller or the device body, and the setting is made in the state fixed to the combining control value α corresponding to the position. In the example shown in FIG. 18, the value α is increased as the bar moves to the left, and the combining is performed while priority is given to processing by the first Retinex processing unit 20. The value α is decreased as the bar moves to the right, and the combining is made while priority is given to processing by the second Retinex processing unit 22.

Note that the item "Combining Setting" 1830 may be configured to switch between the active state and the inactive state in accordance with the selected state of the item "Retinex Method Selection" 1810. That is, when the item "Combining Retinex 1 and 2" is not selected, the item "Combining Setting" 1830 may be entirely set to the inactive state.

The item "Visibility Improvement Processing Intensity Setting" 1840 on the example of the setting menu screen 1800 will be described next. By using the item, the magnitude of the effect of processing by the gain control unit 31 in FIG. 3 can be set. More specifically, the magnitude of the amplitude of the change amount of a gain control value β is changed in accordance with the movement of a slide bar 1840. In all the properties shown in FIGS. 5B, 5D, and 5F, the visibility improvement processing is enhanced more as the amplitude of the change amount of the gain control value β increases.

The item "Illuminance Sensor Adaptive Processing" 1850 on the example of the setting menu screen 1800 will be described next. The item is a menu item used when the user setting unit 400 is provided to the arrangement example of the image display device having the illuminance sensor shown in FIG. 13 in Example 4. In the item "Illuminance Sensor Adaptive Processing" 1850, the user can select either "ON" or "OFF" by moving a cursor 1851 through an operation on an operation button on the remote controller or the device body. When "OFF" is selected, the gain control value in FIG. 16 described in Example 4 is fixed to 1.

According to the image display device provided with the user setting unit 400 described in Example 5 of the present invention described above, the user can adjust image correction processing in each Example of the present invention in accordance with a user's preference, the usage purpose or usage environment of the image display device. This makes it possible to provide a more convenient image display device.

Example 6

Example 6 will exemplify an image display device which corrects an image by decomposing the image for each light reflection property with reference to the arrangement of a projector. Note that the following will exemplify a front projector. However, a rear projection television may be another form of the projector. In addition, a display device using a direct-view flat-panel display designed not to perform enlarged projection on the panel, such as a liquid crystal display, plasma display, or organic EL display may be applied. This point applies to any of Examples to be described below.

Figure 19:
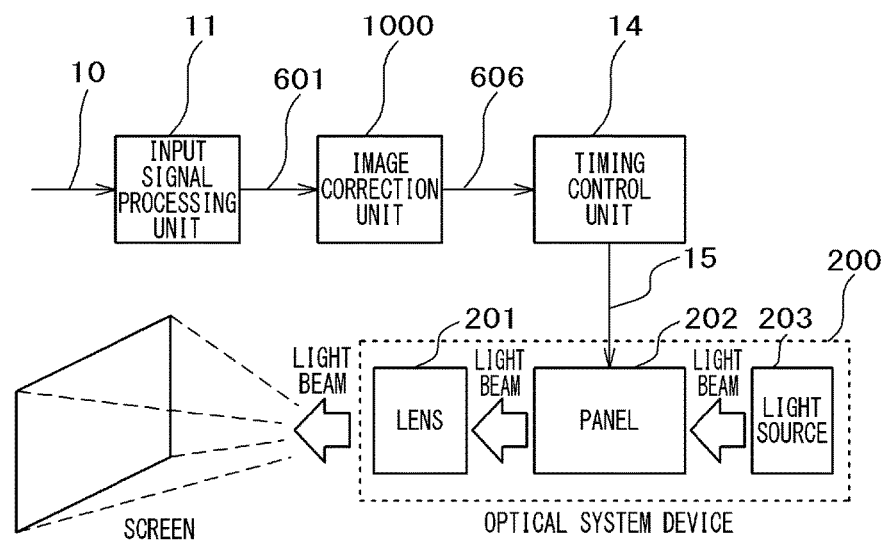
FIG. 19 is a block diagram showing an example of the arrangement of an image display device according to Example 6 of the present invention.

FIG. 19 shows an example of the arrangement of an image display device according to Example 6.

This image display device includes an input signal processing unit 11 which receives an image input signal 10 and converts the image input signal into an internal image signal 601 by, for example, a compressed image signal decoder, IP conversion, or scalar, an image correction unit 1000 which receives the internal image signal 601, a timing control unit 14 which receives an output image signal 606 and generates a display control signal 15 based on the corrected image signal and horizontal/vertical synchronization signals for a display screen, and an optical system device 200 which displays an image. Note that the image correction unit 1000 may be simply expressed as an image processing unit.

The optical system device 200 includes an light source 203 which emits a light beam for projecting an image on the screen, a panel 202 which receives the display control signal 15, adjusts the tone of the light beam from the light source 203 for each pixel, and generates a projection image, and a lens 201 for the enlarged projection of the projection image onto the screen.

When the image display device is a direct-view flat-panel display such as a liquid crystal display, a plasma display, or an organic EL display, the lens 201 of the optical system device 200 is not required. The user directly views the panel 202.

Figure 20:
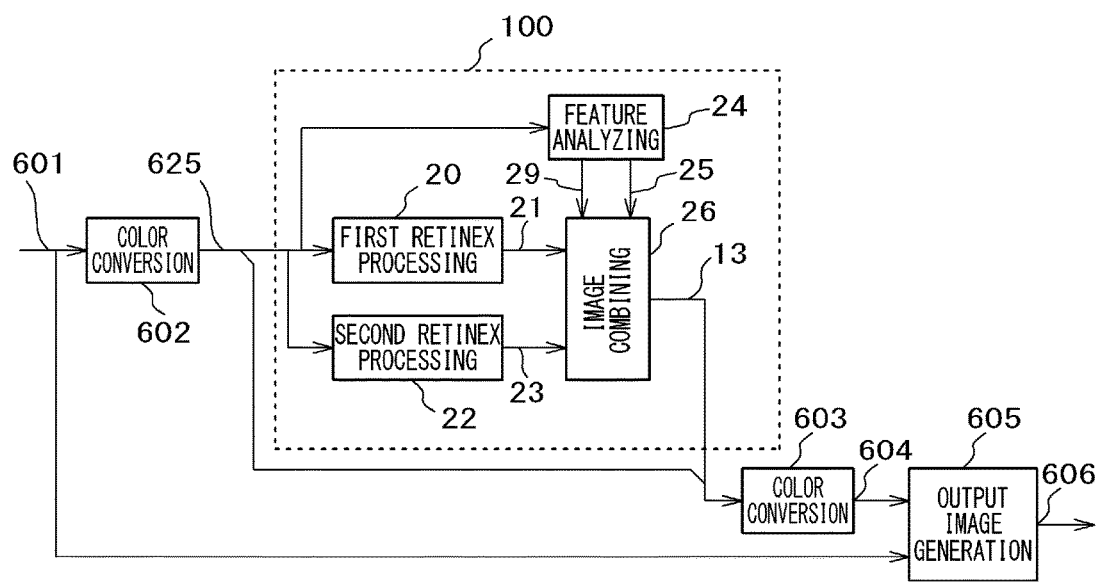
FIG. 20 is a block diagram showing an example of the arrangement of an image correction unit.

FIG. 20 shows an example of the arrangement of the image correction unit 1000. A color conversion unit 602 converts the internal image signal 601 input in the RGB format into, for example, a signal in the YUV format, and outputs it as an internal image signal 625. In this case, the format of the internal image signal 625 is not limited to the YUV format as long as it can be converted into a luminance signal Y and color signals. A first Retinex processing unit 20 and a second Retinex processing unit 22 perform image processing based on the Retinex theory with respect to the luminance signal Y of the internal image signal 625 and respectively output a first corrected image signal 21 and a second corrected image signal 23. Since the operations the first Retinex processing unit 20 and the second Retinex processing unit 22 are the same as those in Example 1, a detailed description of them will be omitted. A feature analyzing unit 24 analyzes the features of the internal image signal 625 and outputs a first image combining control signal 29 and a second image combining control signal 25 to an image combining unit 26. The image combining unit 26 outputs the corrected image signal 13 by combining the corrected image signal 21 and the corrected image signal 23 based on the first image combining control signal 29 and the second image combining control signal 25. The operation of the image combining unit 26 is the same as the example described in Example 1, and a detailed description of it will be omitted. A color conversion unit 603 converts a corrected image signal 13 into a corrected image signal 604 in the RGB format by using the luminance signal Y of the corrected image signal 13 and a color signal UV of the internal image signal 625. At this time, a timing difference in terms of images may occur between the corrected image signal 13 and the internal image signal 625 depending on the processing arrangements of the respective Retinex processing units and the image combining unit 26. In this case, the corrected image signal 13 is converted into the corrected image signal 604 by correcting this timing difference.

Figure 21:
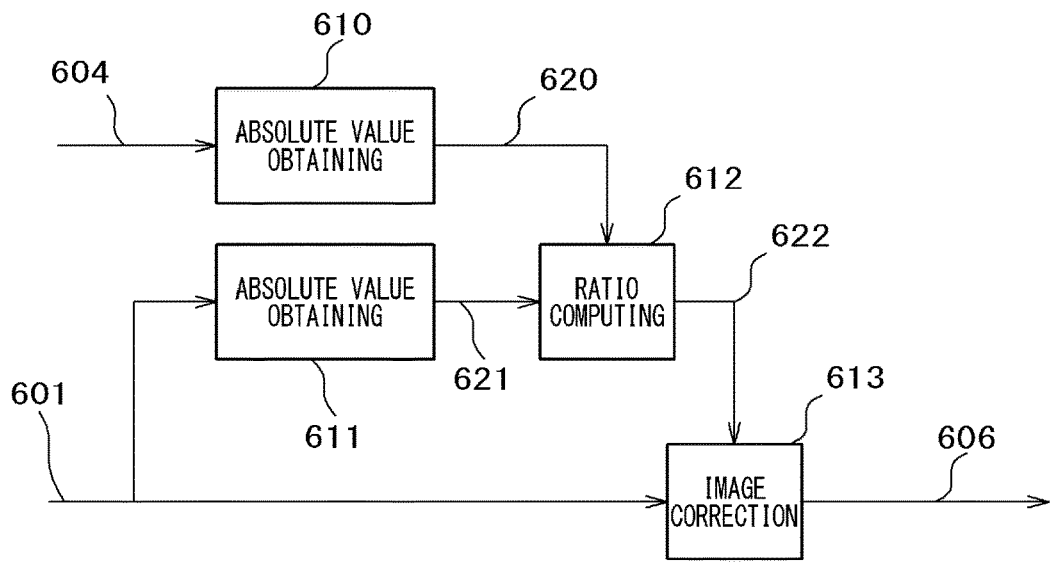
FIG. 21 is a block diagram showing an example of the arrangement of an output image generation unit.

An output image generation unit 605 corrects the internal image signal 601 based on the ratio in image signal level between the internal image signal 601 and the corrected image signal 604, and outputs the resultant signal as the output image signal 606. FIG. 21 shows an example of the arrangement of the output image generation unit 605. An absolute value obtaining unit 610 calculates the absolute value of an image level from the R, G, and B components of the corrected image signal 604, and outputs an image level signal 620. An absolute value obtaining unit 611 calculates the absolute values of image levels from the R, G, and B components of the internal image signal 601, and outputs an image level signal 621. A computing unit 612 obtains the ratio in magnitude between the image level signal 620 and the image level signal 621, and outputs a corrected ratio signal 622. An image correction unit 613 outputs the output image signal 606 by correcting the internal image signal 601 based on the corrected ratio signal 622. More specifically, the image correction unit 613 corrects the internal image signal 601 by multiplying each of the R, G, and B components by the corrected ratio signal 622.

Figure 22:
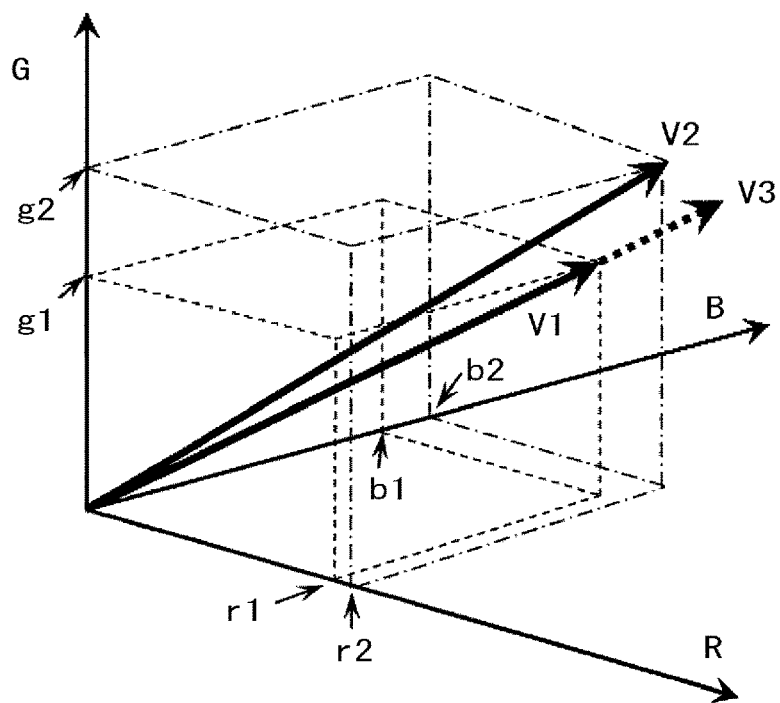
FIG. 22 is a view showing an example of an image signal level.

FIG. 22 shows an example of specific correction. FIG. 22 shows the R, G, and B levels of image signals on the R, G, and B axes in an RGB color space. When the R, G, and B levels of the internal image signal 601 are given by (r1, g1, b1), a vector V1 indicated by an arrow (solid line) is obtained. In this case, the vector V1 has the information of the ratios among a plurality of color parameters of the internal image signal 601. Likewise, when the levels of the corrected image signal 604 are given by (r2, g2, b2), a vector V2 indicated by an arrow (solid line) is obtained. Assume that the absolute value obtaining units 610 and 611 respectively obtain the image level signals 620 and 621 by obtaining the absolute values of the vectors from the respective R, G, and B components, i.e., the lengths of the vectors V1 and V2. The computing unit 612 obtains the ratio in magnitude between the absolute values of the image levels. The image correction unit 613 then performs multiplication by using the obtained ratio.

$$\text{corrected image signal } 606 = V1 * (\text{image level } 620 + \text{image level } 621) \quad [\text{Math 10}]$$

V1=(r1, g1, b1)

A vector V3 indicated by the broken line in FIG. 22 represents the output image signal 606 obtained in this manner. That is, this vector has the same direction as the vector V1, and hence the ratios among the plurality of color parameters of the internal image signal 601 are maintained. This makes it possible to obtain an image with good visibility while holding the same color shade as that represented by the internal image signal 601.

This processing has been described as "corrects the internal image signal 601". The processing can also be expressed as generating a new output image signal based on the vector of the R, G, and B levels of the internal image signal 601, its absolute value, the vector of the R, G, and B levels of the corrected image signal 604, and its absolute value.

The image correction processing by the output image generation unit 605 has been described above by taking, as an example, the correction of the internal image signal 601 by using the ratios among the absolute values of the R, G, and B levels of the internal image signal 601 and the corrected image signal 604. However, it is also possible to correct the internal image signal 601 by using the ratio of a luminance signal (Y).

FIG. 26 shows an example of the arrangement of the image correction unit 1000 in this case. The color conversion unit 602 outputs an internal image signal 626 from the internal image signal 601 in the RGB format. Since the operations of the first Retinex processing unit 20, the second Retinex processing unit 22, the feature analyzing unit 24, and the image combining unit 26 are the same as those described above, a description of them will be omitted. A computing unit 631 of an output image generation unit 630 obtains the ratio between the level of the corrected luminance signal 13 and the luminance signal level of the internal image signal 626, and outputs a corrected ratio signal 632. An image correction unit 633 corrects the internal image signal 601 based on the corrected ratio signal 632 and outputs an output image signal 608. More specifically, the image correction unit 633 corrects the internal image signal 601 by multiplying each of the R, G, and B components by the corrected ratio signal 632. This arrangement example can also obtain an image with good visibility while holding the same color shade as that represented by the internal image signal 601.

The image display device according to Example 6 described above can generate a new image signal based on information concerning the color of an image signal before image correction by Retinex processing (vector information in the color space or the information of the ratios among a plurality of color parameters) and the information of ratios among absolute values or luminances of color space vectors before and after image correction by Retinex processing. This makes it possible to generate and display an image signal close to the color balance before Retinex processing while obtaining the effect of improving visibility by means of Retinex processing.

Example 7

Example 7 will exemplify a case in which the image display device according to Example 6 of the present invention is configured to additionally perform adaptive control in consideration of outside light in a usage environment.

Figure 23:
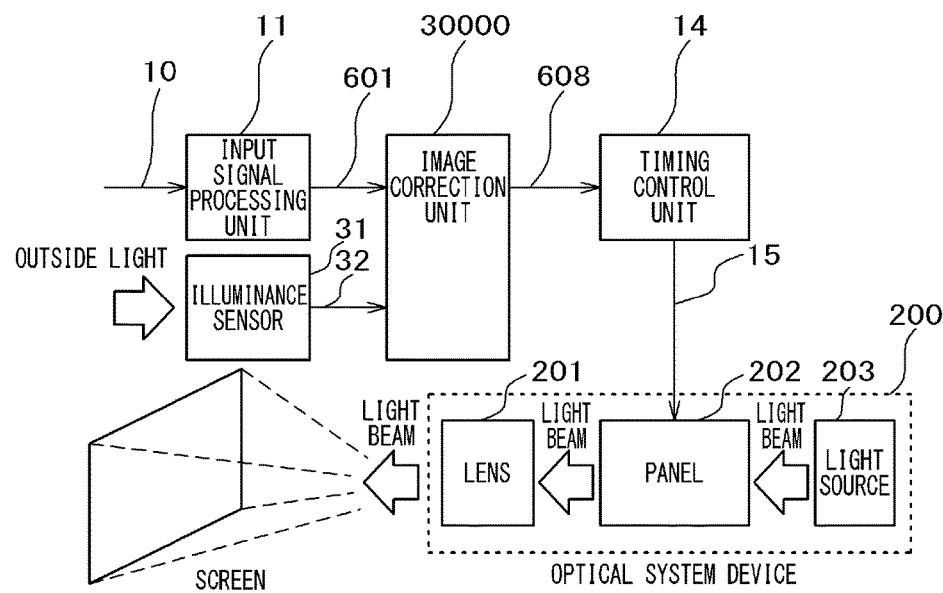
FIG. 23 is a block diagram showing an example of the arrangement of an image display device according to Example 7 of the present invention.

FIG. 23 shows an example of the arrangement of an image display device according to Example 7.

This image display device includes an input signal processing unit 11 which receives an image input signal 10 and converts it into an internal image signal 601 by using, for example, a compressed image signal decoder, IP conversion, or scaler, an illuminance sensor 31 which receives outside light and outputs, for example, an illuminance level signal 32 with 256 level steps, an image correction unit 3000 which receives the internal image signal 601 and the illuminance level signal 32, a timing control unit 14 which receives an output image signal 608 and generates a display control signal 15 based on the corrected image signal and horizontal/vertical synchronization signals for a display screen, and an optical system device 200 which displays an image. Note that the image correction unit 3000 may be expressed as an image processing unit.

Figure 24:
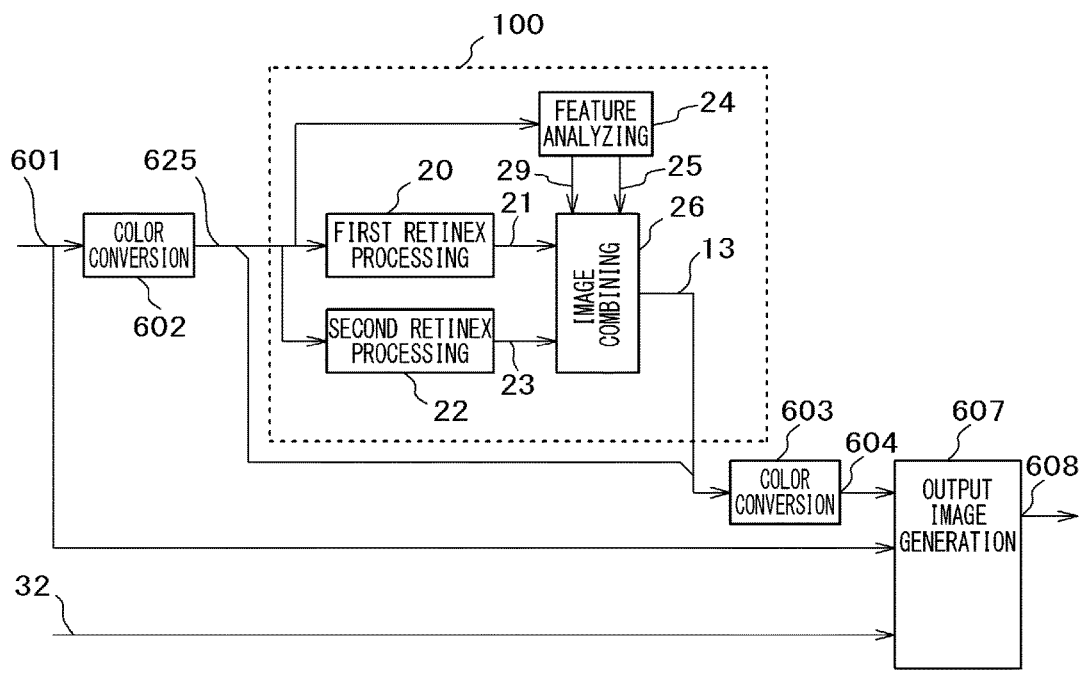
FIG. 24 is a block diagram showing an example of the arrangement of an image correction unit.

FIG. 24 shows an example of the arrangement of the image correction unit 3000. An output image generation unit 607 adaptively combines a corrected image signal 604, the internal image signal 601, and the illuminance level signal 32, and outputs the resultant signal as the output image signal 608. Note that the same reference numerals as those in FIG. 20 described in Example 6 denote constituent elements having the same functions. FIG. 25 shows an example of the arrangement of the output image generation unit 607. An image correction unit 615 performs correction by using the internal image signal 601, a corrected ratio signal 622, and the illuminance level signal 32 in the following manner, and outputs the output image signal 608.

$$\text{corrected ratio signal } 622 = \text{image level } 620 + \text{image level } 621 \text{ output image signal } 608 = V1 * (\text{corrected ratio signal } 622 * (\text{maximum illuminance} + \text{illuminance level signal } 32)) \quad [\text{Math 11}]$$

V1=(r1, g1, b1)

Assume that in the above description, the illuminance level increases in value in proportion to brightness, the maximum illuminance expressed by equations 11 is the maximum illuminance level set in advance, and the illuminance level signal 32 does not exceed the maximum illuminance level. According to processing by the image correction unit 615, when the illuminance level is high, a large correction amount can be set for the internal image signal 601, whereas when the illuminance level is low, a small correction amount can be set for the internal image signal 601. This makes it possible to improve visibility by changing the image correction amount in accordance with the brightness of a place where image display is performed. For example, increasing the image correction amount in a bright place can obtain the effect of further improving visibility.

This processing has been described as "corrects the internal image signal 601". The processing can also be expressed as generating a new output image signal based on the vector of the R, G, and B levels of the internal image signal 601, its absolute value, the vector of the R, G, and B levels of the corrected image signal 604, and its absolute value.

The image display device according to Example 7 described above can generate a new image signal based on information concerning the color of an image signal before image correction by Retinex processing (vector information in the color space or the information of the ratios among a plurality of color parameters) and the information of ratios among absolute values or luminances of color space vectors before and after image correction by Retinex processing. This can further adjust the effect of improving visibility in accordance with the brightness of a place where image display is performed. This makes it possible to generate and display an image signal close to the color balance before Retinex processing while more suitably obtaining the effect of improving visibility by means of Retinex processing.

Example 8

An image display device according to Example 8 is obtained by making the image correction unit 1000 of the image display device according to Example 6 of the present invention shown in FIG. 19 have an internal arrangement like that shown in FIG. 27.

A first Retinex processing unit 20 in FIG. 27 performs the same processing as that performed by the first Retinex processing unit 20 described in Example 3. As described in Example 3, Retinex processing is performed by using the Phong reflection model expressing the shadow of an object surface by using the properties of three kinds of light. As shown in FIG. 27, the image display device according to Example 8 performs image signal generation processing performed by an output image generation unit 605. A color conversion unit 602 converts an internal image signal 601 input in the RGB format into, for example, a signal in the YUV format, and outputs it as an internal image signal 625. In this case, the format of the internal image signal 625 is not limited to the YUV format as long as it can be converted into a luminance signal Y and color signals. The first Retinex processing unit 20 performs image processing based on the Retinex theory with respect to the luminance signal Y of the internal image signal 625, and outputs a corrected image signal 21. A color conversion unit 603 converts the corrected image signal 21 into a corrected image signal 604 in the RGB format by using the luminance signal Y of the corrected image signal 21 and a color signal UV of the internal image signal 625. At this time, a timing difference in terms of images may occur between the corrected image signal 21 and the internal image signal 625 depending on the processing arrangements of the respective Retinex processing units and an image combining unit 26. In this case, the corrected image signal 21 is converted into the corrected image signal 604 by correcting this timing difference.

The output image generation unit 605 corrects the internal image signal 601 based on the ratio in image signal level between the internal image signal 601 and the corrected image signal 604, and outputs the resultant signal as an output image signal 606. This processing is the same as that in Example 6, and the ratio in image level is obtained by using the absolute value of the color space vector of the R, G, and B levels of each image signal or the Y signal of each image signal. According to Example 8, it is possible to obtain the output image signal 606 with high texture quality in consideration of the material of an object in an input image while holding the same color shade of the object.

This processing has also been described as "corrects the internal image signal 601" in Example 8. The processing can also be expressed as generating a new output image signal based on the vector of the R, G, and B levels of the internal image signal 601, its absolute value, the vector of the R, G, and B levels of the corrected image signal 604, and its absolute value.

The image display device according to Example 8 described above can also generate a new image signal based on information concerning the color of an image signal before image correction by Retinex processing (vector information in the color space or the information of the ratios among a plurality of color parameters) and the information of ratios among absolute values or luminances of color space vectors before and after image correction by Retinex processing. This makes it possible to generate and display an image signal closer to the color balance before Retinex processing while more suitably obtaining the effect of improving visibility by means of Retinex processing. In addition, the image display device according to Example 8 can be implemented by an arrangement simpler than that of Example 6.

Note that the arrangement according to Example 8 may be provided with an illuminance sensor 31 as in Example 7 to additionally perform control using an illuminance level signal 32.

In addition, each of the arrangements according to Examples 6, 7, and 8 may be provided with a user setting unit 400 like the one in Example 5 to display a setting menu screen 1800 in FIG. 18 in accordance with an operation signal 401 from the user and allow user settings in the respective items.

REFERENCE SIGNS LIST

10 . . . image input signal
12 . . . internal image signal
13 . . . corrected image signal
15 . . . display control signal
20 . . . first Retinex processing unit
21 . . . first corrected image signal
22 . . . second Retinex processing unit
23 . . . second corrected image signal
24 . . . feature analyzing unit
25 . . . image combining control signal
26 . . . image combining unit
27, 28, 31 . . . gain control unit
29 . . . image combining control signal
30 . . . addition unit
32 . . . illuminance level signal
33 . . . corrected image signal obtained by adaptive control
100 . . . image correction unit
101 . . . reflected light component based on scale 1

102 . . . reflected light component based on scale 2
120 . . . reflected light detection unit based on MSR
122 . . . result of convolution product obtained by scale 1 filter
124 . . . result of convolution product obtained by scale 2 filter
126 . . . resultant value obtained by SSR with scale 1
128 . . . resultant value obtained by SSR with scale 2
130 . . . reflected light control unit based on MSR
131 . . . weighted average resultant value (including gain) based on respective SSR results
152 . . . result of convolution product obtained by specular filter
154 . . . result of convolution product obtained by diffuse filter
156 . . . result of convolution product obtained by ambient filter
158 . . . result of function transformation with respect specular filter
160 . . . result of function transformation with respect diffuse filter
162 . . . result of function transformation with respect ambient filter
181 . . . weighted average resultant value (including gain) with respect to specular and diffuse
302 . . . edge signal
601 . . . internal image signal
602, 603 . . . color conversion unit
604 . . . corrected image signal
605, 607, 630 . . . output image generation
606, 608 . . . output image signal
610, 611 . . . absolute value obtaining unit
612, 631 . . . computing unit
613, 615, 633 . . . image correction unit
1000, 3000 . . . image correction unit

The invention claimed is:

1. A display apparatus, comprising:
an image input unit that receives an image;
an image processor that performs image signal generation by performing Retinex processing on an input image received by the image input unit in a state of a first color space configured with Y-value information and color information, converting an image signal which has undergone the Retinex processing into an image signal of a second color space configured with RGB information from the first color space, and generating a new image signal by correcting the input image using an absolute value of a color space vector of the converted image signal in the second color space without changing a direction of a color space vector of the input image in the second color space; and
a display that displays an image on the basis of the image signal which has undergone image processing performed by the image processor,
wherein the image processor performs first Retinex processing on the input image in the Retinex processing, second Retinex processing of performing second Retinex processing differing in a scheme from the first Retinex processing on the input image as the Retinex processing, and the Retinex processing includes combining processing of combining an image which has undergone the first Retinex processing with an image which has undergone the second Retinex processing in accordance with a feature of the input image.

2. The display apparatus according to claim 1, wherein the image signal generated by the image processor has a vector on a color space in the same direction as a vector of the input image on a color space in the second color space, and the absolute value of the color space vector is equal to an absolute value of the color space vector in the second color space after a signal of the image which has undergone the Retinex processing is converted into the image signal of the second color space.

3. The display apparatus according to claim 1, wherein a setting menu screen is displayable on the display, and
in the setting menu screen, at least two display states among a first state in which an image obtained by combining the image which has undergone the first Retinex processing with the image which has undergone the second Retinex processing is displayed, a second state in which an image which has undergone the first Retinex processing without undergoing the second Retinex processing is displayed, a third state in which an image which has undergone the second Retinex processing without undergoing the first Retinex processing is displayed, and a fourth state indicating an image which has undergone neither the first Retinex processing nor the second Retinex processing is displayed are switchable as a switching setting of an image display state in the display.

4. The display apparatus according to claim 3, wherein, in the setting menu screen, a combining ratio for combining the image which has undergone the first Retinex processing with the image which has undergone the second Retinex processing is changeable.

5. The display apparatus according to claim 1, wherein a scale in the first Retinex processing differs from a scale in the second Retinex processing.

6. The display apparatus according to claim 1, wherein, in the combining processing, a combining ratio for combining the image which has undergone the first Retinex processing with the image which has undergone the second Retinex processing is changed in accordance with luminance information or frequency information of the input image.

7. The display apparatus according to claim 5, wherein the scale in the first Retinex processing is smaller than the scale in the second Retinex processing, and
in the combining processing, the combining ratio of the image which has undergone the first Retinex processing is increased to be larger than the combining ratio of the image which has undergone the second Retinex processing in a case in which the luminance of the input image is relatively high, and the combining ratio of the image which has undergone the first Retinex processing is increased to be smaller than the combining ratio of the image which has undergone the second Retinex processing in a case in which the luminance of the input image is relatively low.

8. The display apparatus according to 1, further comprising:
an illuminance sensor that measures illuminance of external light,
wherein the combining processing is changed in accordance with a measurement result of the illuminance sensor.

9. The display apparatus according to claim 1, wherein the first Retinex processing is processing of separating the input image into a plurality of reflected light components, adjusting each of the plurality of separated reflected light components in accordance with a weight value, performing weighted averaging, and controlling a ratio of reflected light in the image, and
the second Retinex processing is Retinex processing having a larger scale than the first Retinex processing.

10. A projection apparatus, comprising:
an image input unit that receives an image;
an image processor that performs image signal generation by performing Retinex processing on an input image received by the image input unit in a state of a first color space configured with Y-value information and color information, converting an image signal which has undergone the Retinex processing into an image signal of a second color space configured with RGB information from the first color space, and generating a new image signal by correcting the input image using an absolute value of a color space vector of the converted image signal in the second color space without changing a direction of a color space vector of the input image in the second color space; and
a projector that projects an image generated on the basis of the image signal which has undergone image processing performed by the image processor,
wherein the image processor performs first Retinex processing on the input image in the Retinex processing, second Retinex processing of performing second Retinex processing differing in a scheme from the first Retinex processing on the input image as the Retinex processing, and the Retinex processing includes combining processing of combining an image which has undergone the first Retinex processing with an image which has undergone the second Retinex processing in accordance with a feature of the input image.

11. The projection apparatus according to claim 10, wherein the image signal generated by the image processor has a vector on a color space in the same direction as a vector of the input image on a color space in the second color space, and the absolute value of the color space vector is equal to an absolute value of the color space vector in the second color space after a signal of the image which has undergone the Retinex processing is converted into the image signal of the second color space.

12. The projection apparatus according to claim 10, wherein a setting menu screen is displayable on the display, and
in the setting menu screen, at least two display states among a first state in which an image obtained by combining the image which has undergone the first Retinex processing with the image which has undergone the second Retinex processing is displayed, a second state in which an image which has undergone the first Retinex processing without undergoing the second Retinex processing is displayed, a third state in which an image which has undergone the second Retinex processing without undergoing the first Retinex processing is displayed, and a fourth state indicating an image which has undergone neither the first Retinex processing nor the second Retinex processing is displayed are switchable as a switching setting of an image display state in the display.

13. The projection apparatus according to claim 12, wherein, in the setting menu screen, a combining ratio for combining the image which has undergone the first Retinex processing with the image which has undergone the second Retinex processing is changeable.

14. The projection apparatus according to claim 10, wherein a scale in the first Retinex processing differs from a scale in the second Retinex processing.

15. The projection apparatus according to claim 10, wherein, in the combining processing, a combining ratio for combining the image which has undergone the first Retinex processing with the image which has undergone the second Retinex processing is changed in accordance with luminance information or frequency information of the input image.

16. The projection apparatus according to claim 14, wherein the scale in the first Retinex processing is smaller than the scale in the second Retinex processing, and
in the combining processing, the combining ratio of the image which has undergone the first Retinex processing is increased to be larger than the combining ratio of the image which has undergone the second Retinex processing in a case in which the luminance of the input image is relatively high, and the combining ratio of the image which has undergone the first Retinex processing is increased to be smaller than the combining ratio of the image which has undergone the second Retinex processing in a case in which the luminance of the input image is relatively low.

17. The projection apparatus according to claim 10, further comprising:
an illuminance sensor that measures illuminance of external light
wherein the combining processing is changed in accordance with a measurement result of the illuminance sensor.

18. The projection apparatus according to claim 10, wherein the first Retinex processing is processing of separating the input image into a plurality of reflected light components, adjusting each of the plurality of separated reflected light components in accordance with a weight value, performing weighted averaging, and controlling a ratio of reflected light in the image, and the second Retinex processing is Retinex processing having a larger scale than the first Retinex processing.

* * * * *